US011646630B2

(12) United States Patent
Clymer et al.

(10) Patent No.: US 11,646,630 B2
(45) Date of Patent: May 9, 2023

(54) SYSTEM AND METHOD FOR GENERATING ROTATION OF A BODY TO GENERATE ENERGY AND REDUCE CLIMATE CHANGE

(71) Applicant: GREEN WAVE POWER SYSTEMS LLC, Haddam, CT (US)

(72) Inventors: Mark Lawrence Clymer, Moodus, CT (US); Brenda Lee McConnell, Moodus, CT (US)

(73) Assignee: GREEN WAVE POWER SYSTEMS LLC, Haddam, CT (US)

( * ) Notice: Subject to any disclaimer, the term of this patent is extended or adjusted under 35 U.S.C. 154(b) by 0 days.

(21) Appl. No.: 17/936,591

(22) Filed: Sep. 29, 2022

(65) Prior Publication Data

US 2023/0099017 A1    Mar. 30, 2023

Related U.S. Application Data

(60) Provisional application No. 63/294,930, filed on Dec. 30, 2021, provisional application No. 63/285,438,
(Continued)

(51) Int. Cl.
  *H02K 7/08*  (2006.01)
  *H02K 1/17*  (2006.01)
(52) U.S. Cl.
  CPC ............ *H02K 7/08* (2013.01); *H02K 1/17* (2013.01); *H02K 2213/09* (2013.01)
(58) Field of Classification Search
  CPC ......... H02K 7/08; H02K 1/17; H02K 2213/09
(Continued)

(56) References Cited

U.S. PATENT DOCUMENTS

| 3,573,517 A | 4/1971 | Osterstrom |
| 4,795,929 A | 1/1989 | Elgass et al. |

(Continued)

FOREIGN PATENT DOCUMENTS

| CN | 101814871 A | 8/2010 |
| DE | 2423573 A1 | 11/1975 |

(Continued)

OTHER PUBLICATIONS

Extended European Search Report dated Jul. 26, 2022, in connection with corresponding EP Application No. 20738431.4; 8 pages.
(Continued)

*Primary Examiner* — Jose A Gonzalez Quinones
(74) *Attorney, Agent, or Firm* — McCormick, Paulding & Huber PLLC

(57) ABSTRACT

A system and method for generating rotation of a body includes a rotating body configured to rotate about a rotation axis, at least one permanent flanking magnet and a bias object (or material non-uniformity) both arranged at least partially on or within the rotating body, and a drive or ring element. An axial gap between the ring element and the rotating body exists in an axial direction parallel to the rotation axis. The ring element may be a ferrous body, permanent magnet or electromagnet, and the bias object may be made from one or more materials of magnetic states, such as magnetic, ferromagnetic, paramagnetic, and diamagnetic or be a change in material properties of the rotating body. In some embodiments, a center of the ring element is not aligned with the rotation axis. Also, in some embodiments, the speed of, or rotational forces on, the rotating body may be adjusted by adjusting the axial gap or the magnetic field strength of the drive element and/or the flanking magnet(s) or by applying radial forces on the drive element. The
(Continued)

rotating body may be connected to a shaft and drive an alternator to generate clean energy.

20 Claims, 18 Drawing Sheets

Related U.S. Application Data filed on Dec. 2, 2021, provisional application No. 63/250,584, filed on Sep. 30, 2021.

(58) Field of Classification Search
USPC .............................. 310/46, 90, 153, 154.01
See application file for complete search history.

(56) References Cited

U.S. PATENT DOCUMENTS

| | | | |
|---|---|---|---|
| 4,843,268 A | 6/1989 | Hovorka | |
| 4,924,130 A | 5/1990 | Fratta | |
| 4,944,270 A | 7/1990 | Matsushita et al. | |
| 4,991,836 A | 2/1991 | Joffe | |
| 5,896,961 A | 4/1999 | Aida et al. | |
| 5,959,758 A | 9/1999 | Seo | |
| 6,025,667 A | 2/2000 | Narita et al. | |
| 6,054,788 A | 4/2000 | Dombrovski et al. | |
| 6,107,793 A | 8/2000 | Yokotani et al. | |
| 6,232,689 B1 | 5/2001 | Fujita et al. | |
| 6,577,037 B2 | 6/2003 | Killen et al. | |
| 6,682,430 B2 | 1/2004 | Killen | |
| 6,703,829 B2 | 3/2004 | Tola | |
| 6,707,446 B2 | 3/2004 | Nakamura et al. | |
| 7,013,859 B2 | 3/2006 | Linnig | |
| 7,148,680 B2 | 12/2006 | Mizutani et al. | |
| 7,250,702 B2 | 7/2007 | Abou Akar et al. | |
| 7,453,177 B2 | 11/2008 | Highfill et al. | |
| 7,821,168 B2 | 10/2010 | Halstead | |
| 7,994,674 B2 | 8/2011 | McClellan | |
| 8,299,741 B2 | 10/2012 | Prasanna | |
| 8,575,803 B2 | 11/2013 | Kurtani et al. | |
| 8,704,626 B2 | 4/2014 | Fullerton et al. | |
| 9,062,654 B2 | 6/2015 | Yost | |
| 9,331,534 B2 | 5/2016 | Yost | |
| 9,960,647 B2 | 5/2018 | Vann | |
| 10,110,109 B2 | 10/2018 | Farquharson | |
| 10,125,814 B2 | 11/2018 | Walsh | |
| 10,305,360 B2 | 5/2019 | Rustvoid et al. | |
| 11,139,729 B2 | 10/2021 | Rhyu et al. | |
| 2001/0030479 A1* | 10/2001 | Mohler | H02K 26/00 310/156.37 |
| 2002/0050902 A1 | 5/2002 | Asano et al. | |
| 2003/0178103 A1 | 9/2003 | Harimoto et al. | |
| 2004/0064153 A1 | 4/2004 | Creighton, IV et al. | |
| 2004/0251757 A1 | 12/2004 | Porter, Sr. | |
| 2006/0028080 A1 | 2/2006 | Sprain | |
| 2009/0200883 A1 | 8/2009 | Halstead | |
| 2011/0031837 A1 | 2/2011 | Kuritani et al. | |
| 2011/0198958 A1 | 8/2011 | Kozeka | |
| 2014/0213139 A1 | 7/2014 | Ferguson | |
| 2014/0346992 A1 | 11/2014 | Farwell | |
| 2015/0167639 A1 | 6/2015 | Choi et al. | |
| 2015/0180375 A1 | 6/2015 | Kleipa | |
| 2015/0200582 A1 | 7/2015 | Headstrom | |
| 2018/0166949 A1 | 6/2018 | Hu et al. | |
| 2018/0269767 A1 | 9/2018 | Diehl et al. | |
| 2020/0386289 A1 | 12/2020 | Clymer et al. | |
| 2021/0125764 A1 | 4/2021 | Clymer et al. | |
| 2022/0186732 A1 | 6/2022 | McSheery et al. | |

FOREIGN PATENT DOCUMENTS

| | | | | |
|---|---|---|---|---|
| DE | 3931611 A1 | 3/1990 | | |
| EP | 1139354 A2 | 10/2001 | | |
| EP | 1670126 A1 | 6/2006 | | |
| JP | 2010216502 A | 9/2010 | | |
| JP | 2016220505 A | * 12/2016 | | |
| JP | 2016220505 A | 12/2016 | | |
| KR | 1020040096994 A | 11/2004 | | |
| KR | 1020190141306 A | 12/2019 | | |
| KR | 20200019357 A | 2/2020 | | |
| WO | 2011/057423 A1 | 5/2011 | | |
| WO | WO-2011057423 A1 * | 5/2011 | ............. | H02K 53/00 |
| WO | 2018/106935 A2 | 6/2018 | | |

OTHER PUBLICATIONS

International Search Report dated May 8, 2020, in connection with corresponding International Application No. PCT/US2020/021880; 3 pages.
International Search Report dated Jun. 22, 2020, in connection with corresponding International Application No. PCT/IB2020/052039; 3 pages.
International Search Report dated Oct. 25, 2021, in connection with corresponding International Application No. PCT/US2021/040650; 4 pages.
Written Opinion of the International Searching Authority dated May 8, 2020, in connection with corresponding International Application No. PCT/US2020/012880; 11 pages.
Written Opinion of the International Searching Authority dated Jun. 22, 2020, in connection with corresponding International Application No. PCT/IB2020/052039; 5 pages.
Written Opinion of the International Searching Authority dated Oct. 25, 2021, in connection with corresponding International Application No. PCT/US2021/040650; 4 pages.
International Search Report for corresponding PCT Application No. PCT/US2022/045198 dated Jan. 27, 2023.

* cited by examiner

| Rotational Direction | Bottom Ring Magnet Pol. | Top of Flanking Magnet Pol. | Flanking Magnet Position | Bias Object Position | Ring/Flank Attract or Repel | Comments |
|---|---|---|---|---|---|---|
| CW | N | S | 12:00 | 3:00 | Attract | Opposite Pol. w/ Flank & Bias @ 12/3 |
| CW | S | N | 12:00 | 3:00 | Attract | |
| CCW | N | S | 12:00 | 9:00 | Attract | Opposite Pol. w/ Flank & Bias @ 12/9 |
| CCW | S | N | 12:00 | 9:00 | Attract | |
| CCW | N | N | 12:00 | 3:00 | Repel | Same Pol. w/ Flank & Bias @ 12/3 |
| CCW | S | S | 12:00 | 3:00 | Repel | |
| CW | N | N | 12:00 | 9:00 | Repel | Same Pol. w/ Flank & Bias @ 12/9 |
| CW | S | S | 12:00 | 9:00 | Repel | |

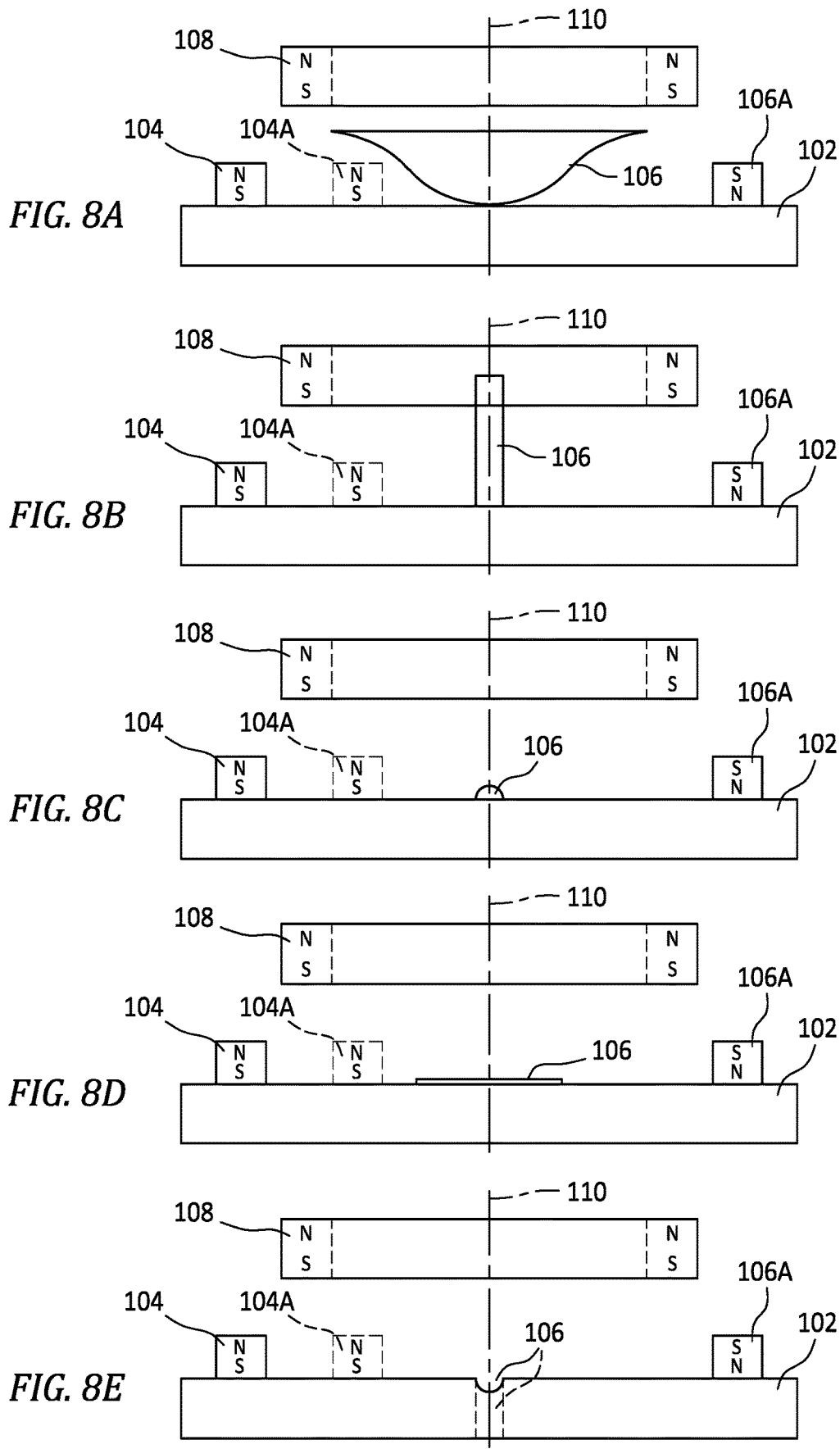

SYSTEM AND METHOD FOR GENERATING ROTATION OF A BODY TO GENERATE ENERGY AND REDUCE CLIMATE CHANGE

CROSS REFERENCE TO RELATED APPLICATIONS

This application claims the benefit of U.S. Provisional Patent Application No. 63/250,584 filed on Sep. 30, 2021, U.S. Provisional Patent Application No. 63/285,438 filed on Dec. 2, 2021, and U.S. Provisional Patent Application No. 63/294,930 filed on Dec. 30, 2021, each of which is hereby incorporated by reference in its entirety, to the fullest extent permitted under applicable law.

BACKGROUND

Systems and methods for causing mechanical motion of a body, including rotational mechanical motion are known. Conventional systems and methods are known for generating mechanical energy or work or motion, such as electric motors. However, such systems use significant electrical power to run and are often inefficient and, in some cases, may burn fossil fuels which cause air pollution and harm the environment and may contribute to climate change. Thus, it would be desirable to design a system and method which overcomes the shortcomings of the prior art discussed above and provides work or motion very efficiently, using less energy than conventional systems.

BRIEF DESCRIPTION OF THE DRAWINGS

FIG. 5C is a table showing rotation direction of the rotating body based on factors such as polarities of the flanking magnet and the ring magnet and position of the flanking magnet and bias object, as shown in FIGS. 5A and 5B, in accordance with embodiments of the present disclosure.

FIG. 8A shows a side view of a system with a plastic bowl bias object, in accordance with embodiments of the present disclosure.

FIG. 8B shows a side view of a system with a rod, stick or dowel bias object, in accordance with embodiments of the present disclosure.

FIG. 8C shows a side view of a system with a drop of water bias object, in accordance with embodiments of the present disclosure.

FIG. 8D shows a side view of a system with a piece of hemp paper (or other flat or thin) bias object, in accordance with embodiments of the present disclosure.

FIG. 8E shows a side view of a system with a divot showing a change in material properties or geometry of the rotating body, in accordance with embodiments of the present disclosure.

DETAILED DESCRIPTION

As discussed in more detail below, the present disclosure is directed to systems and methods for generating rotation of a body, which may be used to drive a generator to create clean energy or propel a drive system of a vehicle to provide propulsion, and which reduce the use of fossil fuels, thereby helping to reduce climate change. The systems and methods of the present disclosure may use permanent magnets of any shape and size, based on the desired design parameters and may be configured with or without a housing, and a bias object or material property discontinuity to generate clean energy. The present disclosure converts potential energy in a permanent ring drive magnet and flanking magnets into kinetic energy of the rotating plate (and attached shaft), and mechanical work, by inputting a very small disturbance into the system and controlling it over time to sustain rotation and energy generation using a small amount of input energy. In particular, magnetic field interaction between a permanent magnet ring drive element, a first flanking magnet, a second flanking magnet, and a bias object causes the body to rotate about a rotation axis. The rotation of the body (and any shaft connected thereto) may be sustained and/or controlled over time using one or more controllers described herein, which controls the lateral and/or vertical position (or gap) of the ring drive element using a small amount input energy or input force, thereby providing clean, sustainable energy generation, or vehicle propulsion, which may help to reduce climate change.

Figure 1A:
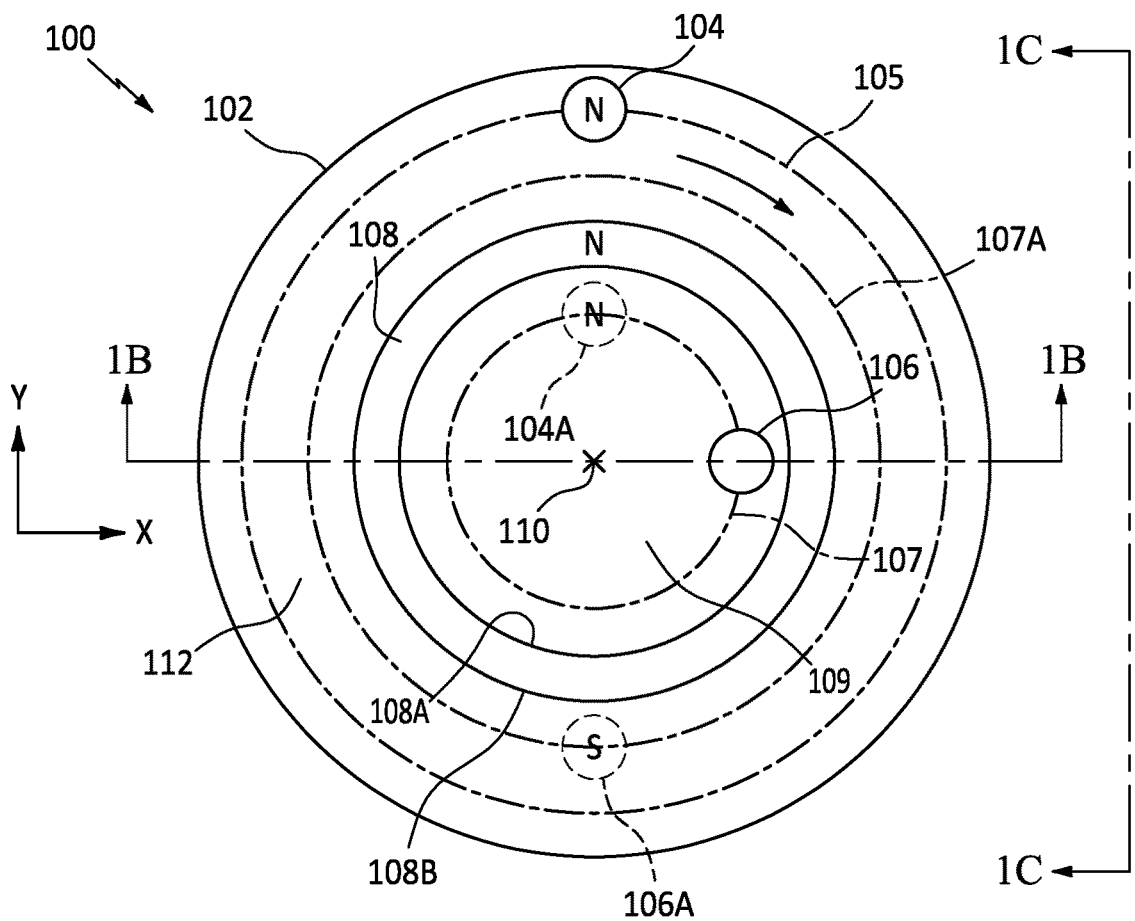
FIG. 1A is a top view of a system for generating rotation in accordance with embodiments of the present disclosure.
Figure 1B:
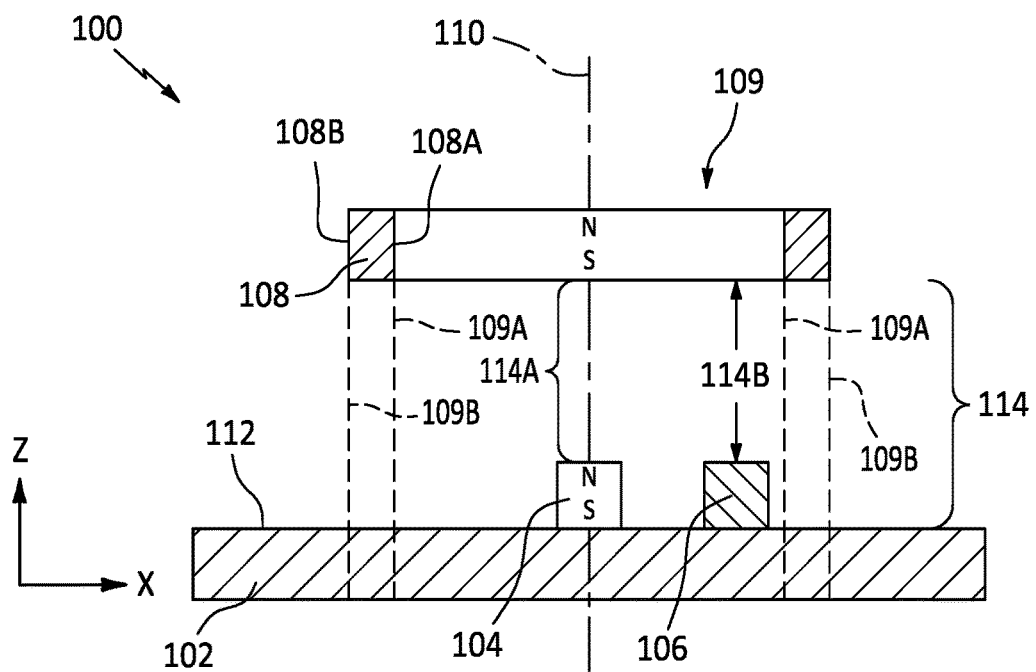
FIG. 1B is a side view of the system of FIG. 1A in accordance with embodiments of the present disclosure.
Figure 1C:
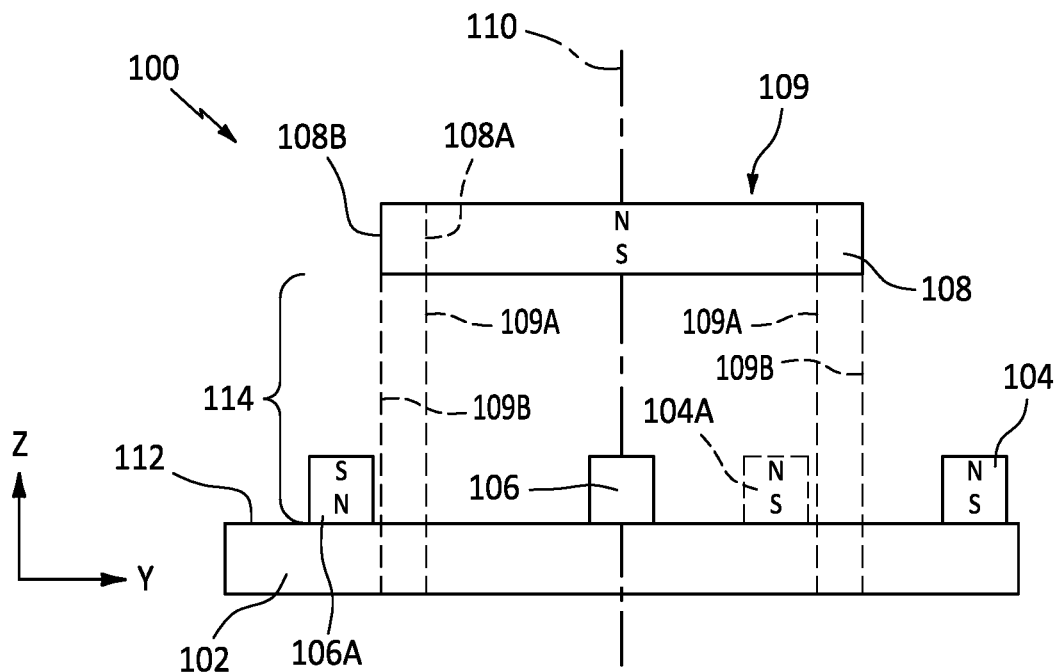
FIG. 1C is another side view of the system of FIG. 1A in accordance with embodiments of the present disclosure.

Referring to FIGS. 1A-1C, an exemplary embodiment of a system for generating rotation is shown in accordance with embodiments of the present disclosure. The system 100 includes a rotating body or object (such as a flywheel or plate-like substrate) 102, at least one flanking magnet 104, at least one bias object 106, an optional second flaking magnet 106A (shown in the drawing as a flanking magnet having a polarity opposite to the polarity of the first flanking magnet 104) and a ring element 108 (or driving element or drive element or drive magnet). The side view shown in FIG. 1B is viewing the system 100 in the direction 1B shown in FIG. 1A with the optional second flanking magnet 106A not shown for viewing of the relative spatial arrangement of the flanking magnet 104 and bias object 106, and the side view shown in FIG. 1C is viewing the system in the direction 1C shown in FIG. 1A. If two flanking magnets 104, 106A are used, they may be polarized oppositely for best results, such that one is axially polarized with north facing the drive element 108 and the other axially polarized with south facing the drive element 108.

Figure 10A:
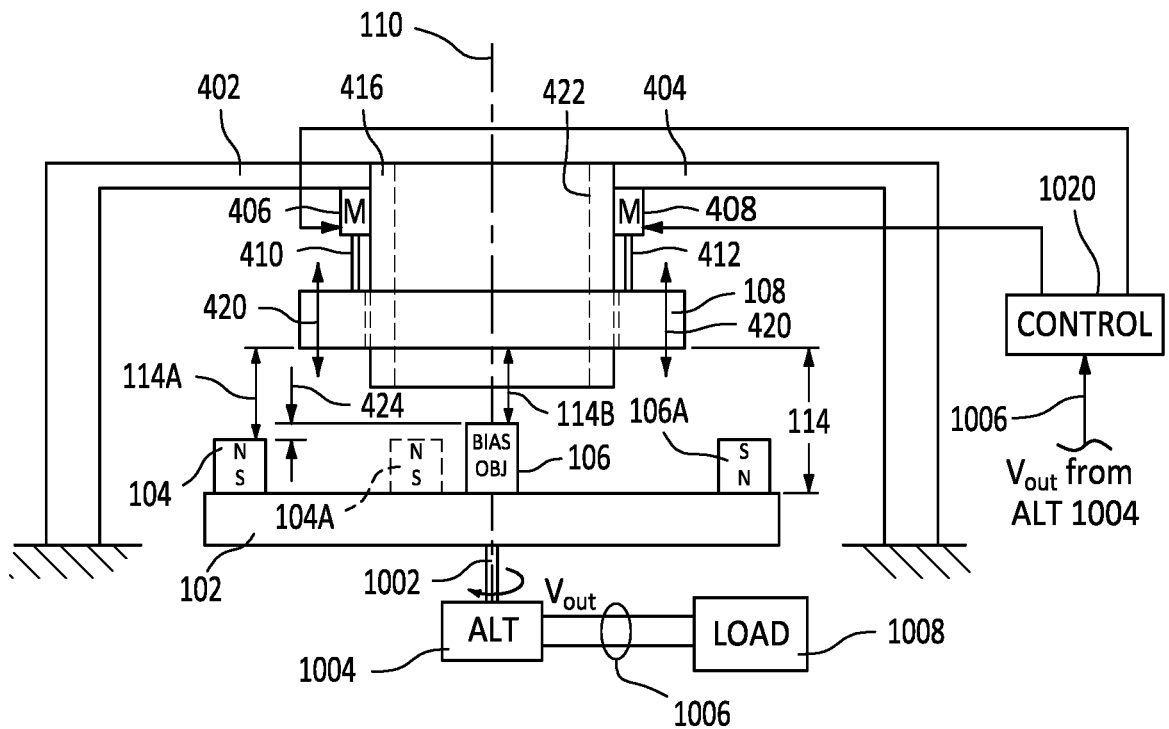
FIG. 10A shows an alternative embodiment for FIG. 4, where the rotating plate drives a shaft which drives an alternator and a load, in accordance with embodiments of the present disclosure.
Figure 10B:
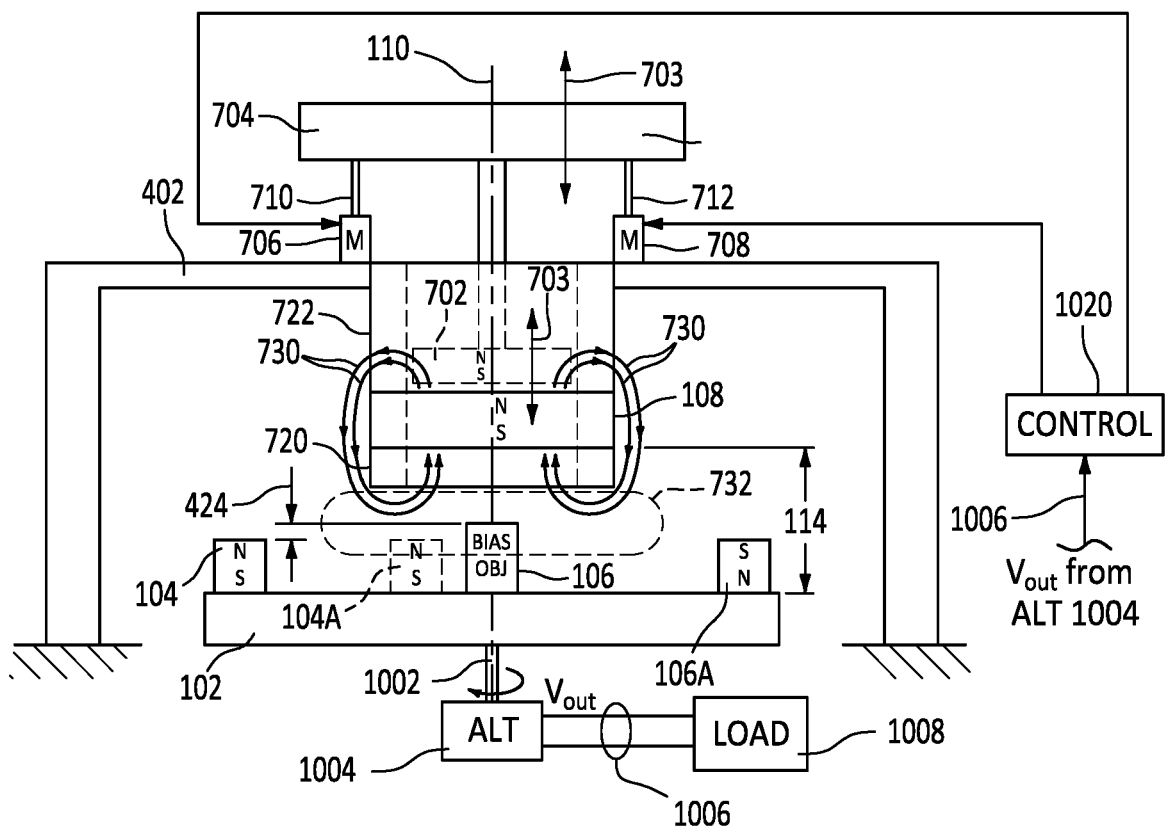
FIG. 10B shows an alternative embodiment for FIG. 7, where the rotating plate drives a shaft which drives an alternator and a load, in accordance with embodiments of the present disclosure.

The rotating body 102 is configured to rotate about a rotation axis 110. In some embodiments, the rotating body 102 may be connected to, or configured to connect to, an alternator/generator to generate power (as shown in FIG. 10A and FIG. 10B) or a drive system of a vehicle (e.g., land, air, or sea vehicles) to provide propulsion. Regardless of whether the rotating body 102 rotates in a clockwise direction or in a counter-clockwise direction, the magnet 104 is connected to the rotating body 102 such that the magnet 104 (or flanking magnet or flank magnet) will move with the rotating body 102. During rotation of the rotating body 102, the flanking magnet 104 will move along a magnet travel path 105 and the bias object 106 will move along a bias object travel path 107. The optional second flanking magnet 106A will move along a second flanking magnet path 107A. In some embodiments, the paths 105, 107A for the first and second flanking magnets may be the same path if the distance from the rotation axis is the same. The flanking magnet(s) 104, 106A and bias object 106 may each independently be disposed completely or partially on top of, within, or underneath the rotating body 102. In some embodiments, the flanking magnet 104A may be placed on the same rotational path 107 as the bias object 106, both being inside the diameter of the ring magnet 108. In some embodiments, the bias object 106 may be located at a bias point or region (discussed more hereinafter).

Axis diagrams of FIGS. 1A, 1B, and 1C are provided for illustrating the X, Y, Z planes to aid in understanding the relative positions of different elements. The rotating body 102 is generally extending and parallel in an X-Y plane. The ring element 108 is separated from the rotating body 102 by axial gap 114 in the Z-axis direction (or parallel to the rotation axis 110). The gap may also be measured by the distance 114A from the top of the flanking magnet 104 or 104A (i.e., the gap 114A).

The gap that influences the rotational speed of or angular forces on the rotating body 102, may be measured from bottom of the drive magnet or element 108 to the upper surface 112 of the rotating object 102 or to the upper surface 112, shown as a gap 114, or from the bottom of the drive magnet 108 to the upper surface of the flanking magnet 104, shown as a gap 114A, or from the bottom of the drive magnet 108 to the upper surface of the bias object 106, shown as a gap 114B, all of which may be referred to generally herein as the gap 114. In some embodiments where the flanking magnets 104, 106A and/or the bias object 106 are embedded or otherwise disposed within the rotating body 102 such that the upper surfaces of the flanking magnet and rotating body are at the same height, the gaps 114A, 114B, respectively, become the same as the gap 114.

In this embodiment, the ring element 108 (or driving element or drive element) is a magnet that is axially magnetized with a bottom side facing the rotating body 102 having a south polarity, and a top side facing away from the rotating body 102 having a north polarity. The ring element 108 has a radially inner surface 108A having a ring element inner diameter (or ID) and a radially outer surface 108B having a ring element outer diameter (or OD). The radially inner surface 108A of the ring element 108 defines a ring opening 109. The ring element 108 is separated from a top surface 112 of the rotating body 102 by a non-zero gap distance 112. The ring element 108 is arranged such that the rotation axis 110 extends through the ring opening 109. The ring element 108 is arranged such that the ring element 108 (or a transverse or X-Y plane of the ring) is substantially parallel to the rotating body 102 (or a transverse or X-Y plane of the rotating body), i.e. the radial directions of the ring element 108 are substantially parallel to the radial directions of the rotating body 102. However, in some embodiments, the ring element 108 may be arranged such that the X-Y plane of the ring element 108 is not parallel to X-Y plane of the rotating body 102.

Broken lines 109A extending from the inner surface 108A (e.g. a bottom of the inner surface 108A) of the ring or drive element 108 in a direction parallel to the rotation axis 110 enclose, at any given moment, an area on the top surface 112 of the rotating body 102 and/or within the rotating body 102 and may be referred to herein as the ring opening zone, which is also within the inner diameter (ID) of the ring element 108. The ring opening zone has an area equal to the area of the ring opening 109 when the ring element 108 is arranged parallel to the rotating body 102, and the ring opening zone has an area less than the area of the ring opening 109 when the ring element 108 is not arranged parallel to the rotating body 102.

Broken lines 109B extending from the outer surface 108B (e.g. a bottom of the outer surface 108B) of the ring element 108 in a direction parallel to the rotation axis 110 enclose, at any given moment an area on the top surface 112 of the rotating body 102 and/or within the rotating body 102 and may be referred to herein as the ring element coverage zone, which is also outside the outer diameter (ID) of the ring element 108. Similar to the ring opening zone discussed above, the ring element coverage zone is at a maximum when a longitudinal extension of the ring element 108 is arranged parallel to the rotating body top surface (i.e., perpendicular to the axis of rotation 110).

The flanking magnet 104 or 104A may be a cylindrical magnet that is axially magnetized with the north polarity side facing up, away from the rotating body 102. However, in some embodiments the south polarity side of the flanking magnet 104 is facing up, away from the rotating body 102 (or towards the ring element 108). The flanking magnet 104 is arranged such that at least a portion of the radially outer surface 108B of the ring element 108 is between the magnet 104 and the rotation axis 110. The bias object 106 is arranged such that the bias object 106 is closer to the rotation axis 110 than at least a portion of the radially inner surface 108A. The optional second flanking magnet 106A is arranged such that the second flanking magnet 106A is farther from the rotation axis 110 than at least a portion of the radially outer surface 108B. Also, in some embodiments, the flanking magnets 104 (or 104A), 106A may be covered by, or encased in, a diamagnetic material, such as plastic or rubber (not shown). Other materials may be used for the flanking magnet cover provided it does not impact the desired performance.

The flanking magnet 104 or 104A or 106A and/or the ring or drive element 108 magnet may be permanent magnets or electromagnets.

Figure 2:
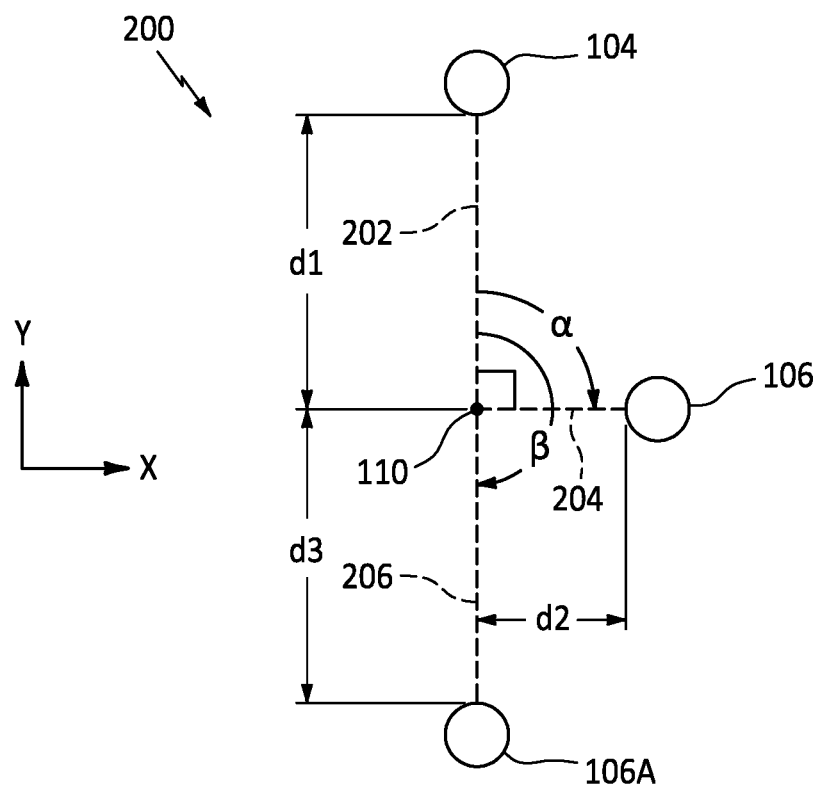
FIG. 2 is a diagram of the relative positions of a magnet and a bias object of the system of FIG. 1A from a top view in accordance with embodiments of the present disclosure.

Referring to FIG. 2, a top view diagram 200 of the relative positions of the flanking magnets 104, 106A and bias object 106 in relation to the rotation axis 110, measured in the X-Y plane independent of their relative heights in the Z direction, is shown in accordance with embodiments of the present disclosure. The flanking magnet 104 is arranged a non-zero distance d1 (or flanking magnet distance) from the rotation axis 110 in a direction perpendicular to the rotation axis 110 (i.e. in a radial direction), the bias object 106 is arranged a non-zero distance d2 (or first bias object distance) from the rotation axis 110 in a direction perpendicular to the rotation axis (i.e. in a radial direction), and the second flanking magnet 106A is arranged a non-zero distance d3 (or second flanking magnet distance) from the rotation axis 110 in a direction perpendicular to the rotation axis (i.e. in a radial direction). Also, the flanking magnet 104 and the bias object 106 form an angle α (alpha), or a bias object angle or bias angle, with the rotation axis 110 being the central vertex and the flanking magnet 104 and the second flanking magnet 106A forms an angle β (beta), or a flanking magnet angle or flanking angle, with the rotation axis 110 being the central vertex. It follows from the above discussion with respect to the positions of the flanking magnet 104 and bias object 106 in connection with the ring opening zone that, in some embodiments, the distance d2 is less than the distance d1 (and inside the ring opening zone). It follows from the above discussion with respect to the positions of the forst flanking magnet 104 and second flanking magnet 106A in connection with the ring opening zone that, in some embodiments, the distance d3 is greater than the distance d2 (and outside the ring opening zone). In some embodiments, the distances d1 and d2 may be less than the inner diameter of the drive element 108, when the drive element 108 is a hollow cylinder, such as that shown in FIG. 1C with the flanking magnet 104A. Also, in some embodiments, the first bias object distance d1 may be the same as or different from the second bias object distance d3, provided they are both located outside the outer diameter of the drive element 108.

While the flanking magnet 104 and the bias object 106 are shown in FIGS. 1A-1C and FIG. 2 as forming the first bias object angle a (alpha) (with the rotation axis 110 being the central vertex) in amount of 90° (i.e. a right angle) by virtue of a direct path 202 of the magnet 104 to the rotation axis 110 and a direct path 204 of the bias object 106 to the rotation axis 110, it is within the scope of the present disclosure for the angle alpha of the magnet 104, rotation axis 110 and bias object 106 to be virtually any angle depending on the desired performance. A preferred value for the first bias object angle is about 90 degrees (or about 270 degrees), which forms a right triangle between one (or each) flanking magnet 104, 106A and the bias object 106 and the rotational axis 110 (which triangle may be referred to herein as the "Clymer Triangle"). However, other angles may be used if desired depending on the desired performance requirements. For example, and without limitation, the first bias object angle (alpha) of the flanking magnet 104, rotation axis 110 and bias object 106 may be 15°, 30°, 45°, 60°, 75°, 90° or may be any angle between 0 and 360 deg. We have found that system performance is preferred when the bias object angle alpha is other than 0° or 180° such that the bias object 106 is not arranged in the direct path (or straight line) 202 between the magnet 104 and the rotation axis 110 (on the other side of the rotation axis 110 if the direct path 202 were to continue through the rotation axis 110, i.e. alpha not 180°). Thus, the bias object 106 and the flanking magnet 104 form first bias object angle (alpha) with the rotation axis 110 at the vertex, such that they do not lie on the same line as the rotation axis, or such that the angle is other than 0 or 180 degrees. The second flanking magnet 106A, rotation axis 110, and the flanking magnet 104 form the second flanking magnet angle (beta). In preferred embodiments, the second flanking magnet angle beta formed by the second flanking magnet 106A and the first flanking magnet 104 is about 180°, as shown in FIGS. 1A and 2, i.e., the second flanking magnet 106A and the first flanking magnet 104 lie on the same line as the rotation axis 110, or the flanking magnet 104, rotation axis 110 and second flanking magnet 106A all lie on the same straight line, or the second flanking magnet 106A lies on a straight line formed by the first flanking magnet 104 and rotation axis 110, or the second flanking magnet 106A and the first flanking magnet 104 form a straight line that passes through the rotation axis 110.

If the flanking magnet 104 and first bias object 106 are not arranged at the same height and/or if the flanking magnet 104 and bias object 106 are different shapes/sizes, the bias object angle (alpha) may be determined as if they were at the same height based on their positions relative to the rotation axis 110 and their direct paths 202, 204 (in the X-Y plane) when viewed from a top view of the rotation axis 110 (as shown in FIG. 2). Similarly, if the flanking magnet 104 and second flanking magnet 106A are not arranged at the same height and/or if the flanking magnet 104 and second flanking magnet 106A are different shapes/sizes, the second flanking magnet angle (beta) may be determined as if they were at the same height based on their positions relative to the rotation axis 110 and their direct paths 202, 206 (in the X-Y plane) when viewed from a top view of the rotation axis 110 (as shown in FIG. 2).

In operation, the configuration of the flanking magnet 104, bias object 106 and ring element 108 cause the rotating body 102 to rotate about the rotation axis 110 when the ring element is sufficiently close to the magnet 104 and/or the bias object 106. As shown, the ring element 108 having the south polarity side facing towards the rotating body 102 (and the magnet 104 having the north polarity side facing away from the rotating body 102) will cause the rotating body 102 to rotating in a first direction, as discussed further with FIG. 5C. If the polarity of the ring element 108 is reversed (e.g., by flipping the ring element 108 by 180° or by changing the electro magnet ring element 108 polarity through a change in current flow), or if the polarity of the flanking magnet 104 is reversed, then the rotating body 102 will be caused to rotate in a second direction, the second direction being opposite to the first direction, as discussed further with FIG. 5C.

In some embodiments, the bias object travel path 107 will be entirely within the ring opening zone of the ring element 108 through a full rotation of the rotating body 102 (i.e. through 360° of rotation). In some embodiments, at least a portion of the bias object travel path 107 will be within the ring opening zone of the ring element 108 through a full rotation of the rotating body 102.

In some embodiments, the magnet travel path 105 will be entirely outside of the ring element coverage zone through a full rotation of the rotating body 102. In some embodiments, at least a portion of the magnet travel path 105 will be outside of the ring element coverage zone through a full rotation of the rotating body 102.

The relative positions of the elements can be predetermined and/or dynamically adjustable as desired in order to achieve certain system characteristics and/or for controlling the system during operation. For example, the gap 114 between the rotating body and ring element 108 can be fixed and/or dynamically adjustable during operation to change an acceleration and/or speed of the rotating body 102. The gap 114 may be adjustable by, for example, movement of the ring element 108 in the Z-axis direction through known actuation devices and methods. Similarly, lateral or transverse displacement (perpendicular to the rotation axis 110) of the ring element 108, may be achieved so that the ring opening 109 is not perfectly centered about the rotation axis 110 as desired and/or during operation to control the rotation characteristics of the rotating body 102 through known actuation devices and methods. In some embodiments, the rotating body 102 and/or the ring element 108 are resiliently held by a retaining mechanism(s) to allow some movement in one or more directions, but then returned to a default position. For example, lateral springs (or other elastic structure or material) may hold the ring element 108 such that lateral displacements of the ring element 108 are allowed, but the ring element 108 is urged by the spring(s) back to a default position, e.g. centered about the rotation axis 110.

The rotating body 102 may be made up of virtually any material(s) that provided the desired function and performance. In some embodiments, the rotating body 102 comprises diamagnetic material(s) and/or paramagnetic material(s). For example, and without limitation, the rotating body 102 may comprise metal, wood, plastic, or any combination thereof. Also, in some embodiments, the rotating body 102 on which the flanking magnet and bias objects are located, may be made of a light weight material to reduce the amount of weight to move and also strong enough to support the weight and angular forces exerted by the flanking magnet and bias objects, and/or may be made of a material that does not introduce too much magnetic drag on the rotating body 102, based on desired performance.

As discussed above, the magnet(s) 104 shown and described is a cylindrical magnet. However, any type or shape of magnet is within the scope of the present disclosure. For example, the magnet 104 may be selected from rectangular bar magnets, ring magnets, circular flat (or disc) magnets, or the like.

The bias object 106 may comprise one or more materials. For example, and without limitation, the bias object 106 may comprise a ferrous material (e.g. non-permanent magnet ferrous material), a magnet (permanent or electro), bismuth, copper, aluminum, plastic, rubber (or other polymer), water, hydrogel (or other cross-linked hydrophilic or hydrophobic polymer), or any combination thereof. In some embodiments, the bias object 106 is made from one or more materials of four classes of magnetic states: (i) magnetic materials (electro or permanent); (ii) ferromagnetic (e.g. metals like iron that can retain a field when exposed to a magnetic field); (iii) paramagnetic (e.g. materials like aluminum, copper, or the like, that are very weakly ferromagnetic but cannot retain a magnetic field when the source field is removed); and (iv) diamagnetic (i.e. materials that repulse magnetic fields, no matter what the polarity of the induced magnetic field, e.g. graphite, bismuth, plastic, rubber (or other polymer), water, hydrogel (or other cross-linked hydrophilic or hydrophobic polymer), wood, or the like). With diamagnetism, many common materials such as water, wood, even fingers, or the like, are usually considered to be non-magnetic but, in fact, are very weakly diamagnetic. Diamagnet materials repel, and are repelled by, a strong magnetic field. The electrons in a diamagnetic material rearrange their orbits slightly creating small persistent currents which oppose the external magnetic field. The forces created by diamagnetism are extremely weak, millions of times smaller than the forces between magnets and such common ferromagnetic material like iron. Two of the strongest diamagnetic materials are graphite and bismuth, and, thus, in some embodiments may provide an enhanced rotational effect on the rotating body. In some embodiments, the object 106 may be preferably made of a diamagnetic material, e.g., wood, plastic, rubber (e.g., a rubber washer or o-ring) (or other polymer), water, hydrogel (or other cross-linked hydrophilic or hydrophobic polymer), or any other diamagnetic material, but other material types may be used, such as a ferromagnetic or ferrous material, e.g., metal, or other types of materials (as described herein) provided it does not introduce too much magnetic drag on the rotating body 102, based on desired performance.

If the bias object 106 is a magnet, the polarity of the side of the bias object(s) 106 facing the ring element 108 may preferably be opposite to the polarity of the side of the magnet 104 facing the ring element. If the rotating body 102 is made of steel, the flanking magnet(s) 104, 106A may be magnetically fixed or attached to the rotating body 102; otherwise, the magnet(s) 104, 106A may be fixed to the body by bolts, glue, clamps, or other attachment means. The magnet(s) 104, 106A may also be embedded into the rotating body 102 if desired. The bias object 106 may be fixed to the rotating body 102 through any connection means or devices, for example and without limitation, through glue, bolts, clamps, or any other attachment means that keeps the bias object in position even during rotation of the body 102 at high speeds.

In some embodiments, the ring element 108 may be made of a ferrous material. In some embodiments, the ring element 108 is a permanent magnet that is axially magnetized (e.g. having a side of one polarity, i.e., north or south, facing the rotating body 102 and having an opposite side facing away from the rotating body 102 of an opposite polarity, i.e. north or south).

Although the embodiments of the present application have been shown and described as being configured with permanent magnet(s) 104, 106A 108, it is within the scope of the present disclosure to make one or more of the magnets 104, 106A, 108 described herein to be a permanent magnet, an electromagnet, or a permanent magnet and electro magnet combination. If any of the magnets 104, 106A, 108 is an electromagnet, the electro magnet may be configured to dynamically change polarity based on a change in direction of energization in a coil to cause the electro magnet to become magnetized in a first direction (e.g. having north polarity facing the rotating body 102) or in a second direction opposite to the first direction (e.g. having south polarity facing the rotating body). In some embodiments, the strength of the energizing current to the coil(s) is configured to be changed such that the strength of the magnetic field generated by the electromagnet 104, 106A, 108 is selectable, adjustable and/or controllable.

The rotation of the rotating body 102 may be used for any application suitable for a rotating body to perform work, such as, for example, generating electricity, propelling an automobile, driving a propeller of a boat or airplane, and the like. Embodiments according to the present disclosure may be used in residential, commercial, and/or utility scale use applications.

Figure 3A:
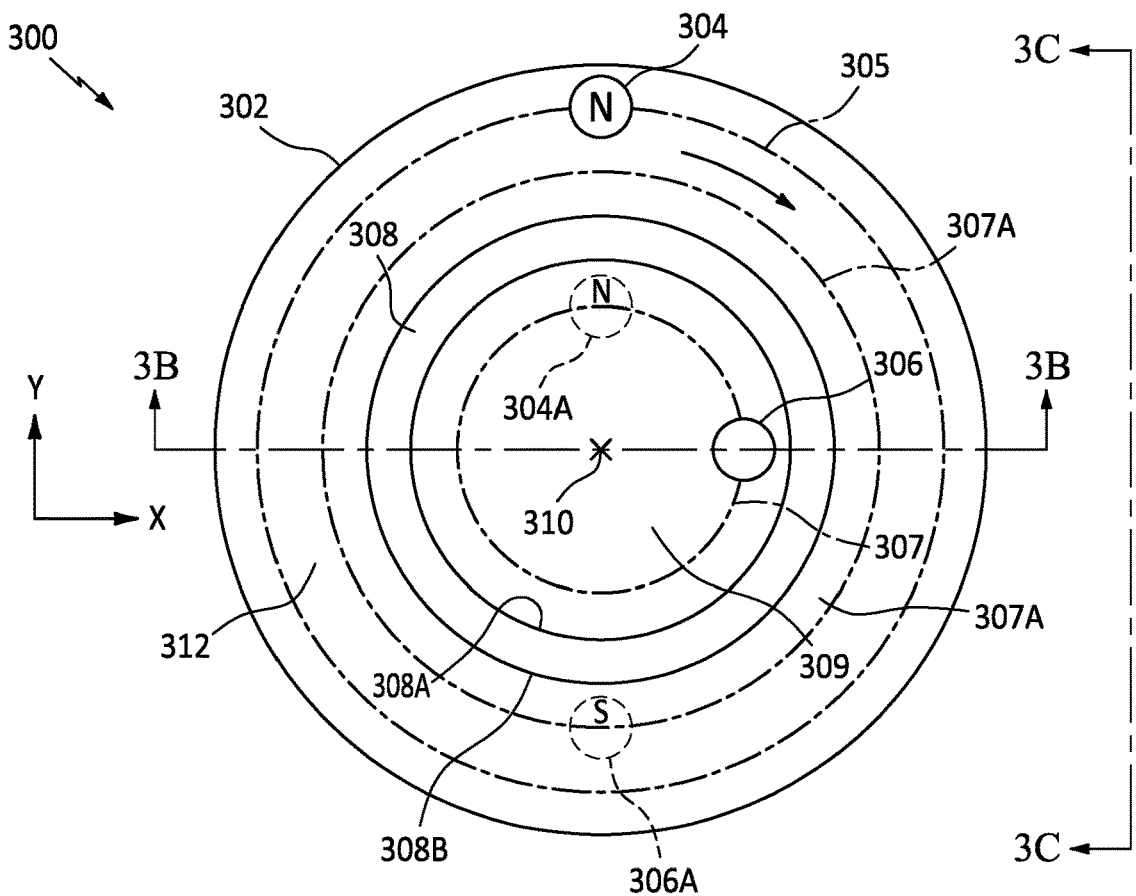
FIG. 3A is a top view of a system for generating rotation in accordance with embodiments of the present disclosure.
Figure 3B:
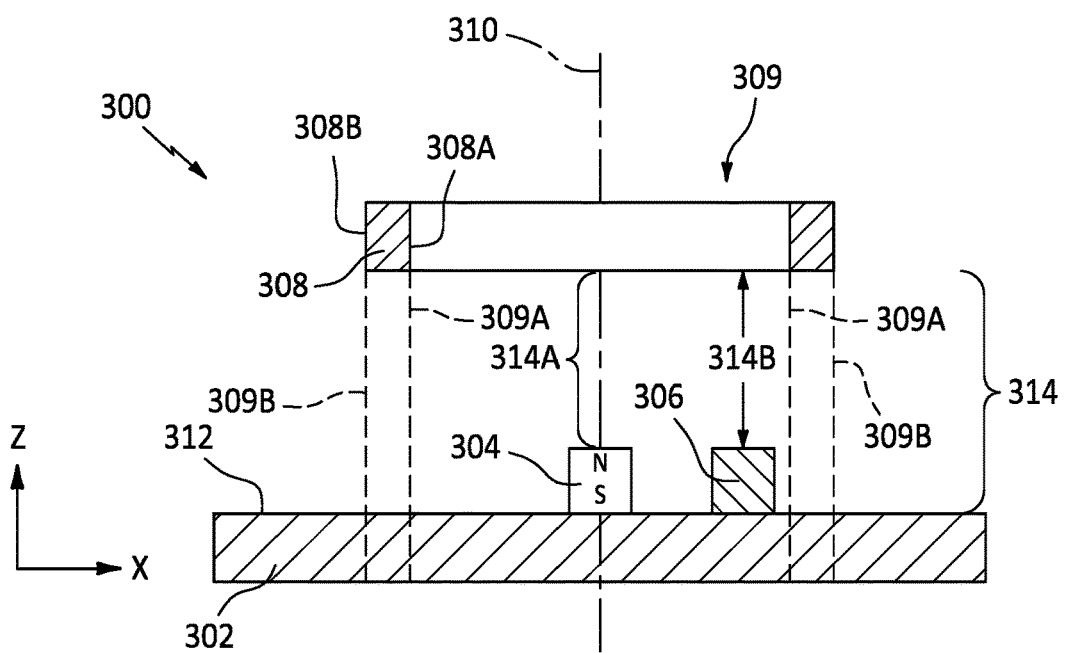
FIG. 3B is a side view of the system of FIG. 3A in accordance with embodiments of the present disclosure.
Figure 3C:
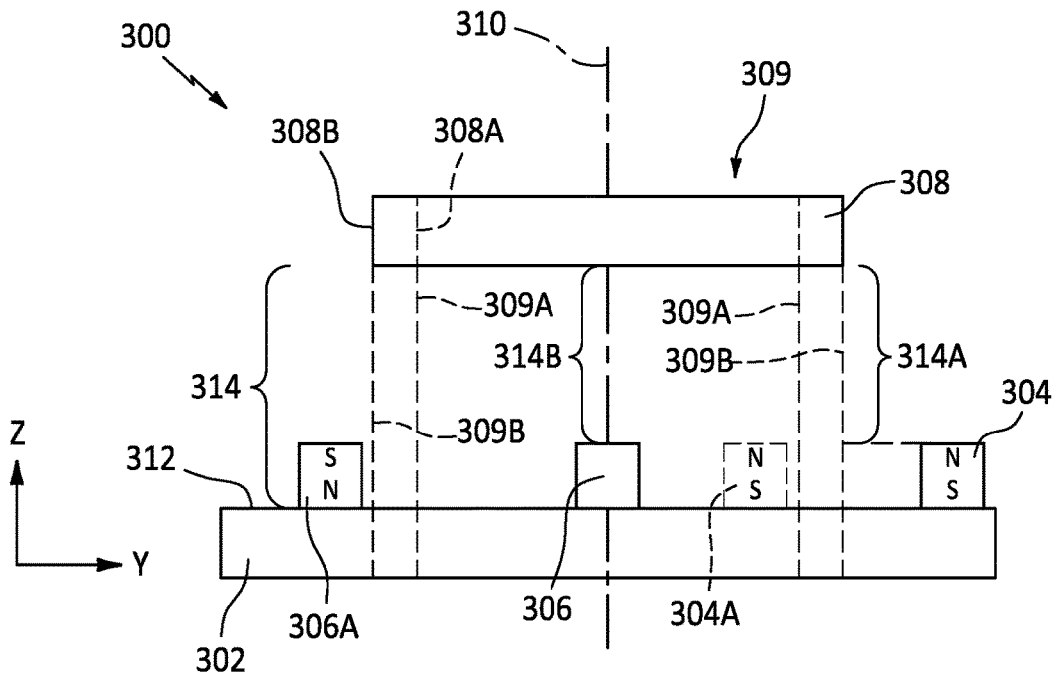
FIG. 3C is another side view of the system of FIG. 3A in accordance with embodiments of the present disclosure.

Referring to FIGS. 3A-3C, an exemplary embodiment of a system for generating rotation is shown in accordance with embodiments of the present disclosure. The system 300 is substantially similar to the system 100 shown in FIGS. 1A-1C with like reference numerals representing like elements (with 100's numerals changed to corresponding 300's numerals) and, thus, the elements and configurations will not be repeated here. One difference between the system 300 of FIGS. 3A-3C and the system 100 of FIGS. 1A-1C is that the ring element 308 is not a magnet. Rather, the ring element 308 is a non-permanent magnet ferrous material ring element.

The operation of the elements in the system 300 to generate rotation of the rotating body 302 is substantially similar to the operation discussed above in connection with the system 100 of FIGS. 1A-1C. However, the flipping of the ring element 308 will not provide a manner for changing direction of rotation of the rotating body 302 as the ring element 308 does not have sides with permanent or active polarity as a permanent ring magnet or electro ring magnet would have. The ring element 308 would work in the operation of the system 300 to on either side (facing up away from the rotating body 302 or facing down towards the rotating body 302) without causing a change in direction of rotation of the rotating body 302.

It should be readily understood that the magnetic polarity of the magnets of the systems and methods described herein can be reversed and achieve the same intended function and structure. Specifically, a magnet side (or surface) having north pole N polarity may instead have south pole S polarity and a magnet side (or surface) having south pole S polarity may instead have north pole N polarity, and the systems and methods will function substantially the same as disclosed herein.

While the present disclosure has shown and described the permanent magnets as being circular flat magnets, cylindrical magnets and bar magnets, it should be readily understood that any permanent magnet shape is within the scope of the present disclosure. The magnet(s) may differ in shape and type. For example, the cylindrical magnets may be cylinders and/or cylinders with a central bore or hole defined therein in a longitudinal direction of the cylindrical magnet(s). Instead of the central bore (or in addition thereto), the magnets may be provided with blind bores. Magnets may be configured with the necessary central bore and/or blind bores for enhancing the magnetic fields thereof or generating the desired magnetic fields thereof. Other magnet shapes, such as rectangular magnets or flat magnets, may have transverse (through the thickness) bores or holes or blind bores for enhancement or desired magnetic field shapes/strengths. Further, while various magnets have been described as being separate magnets, it is within the scope of the present disclosure for the magnets to form a single, unitary piece or structure. Also, any given permanent magnet described herein may comprise a plurality of smaller permanent magnets that are stacked together to perform the same function and polarity as the given permanent magnet, if desired.

Figure 4:
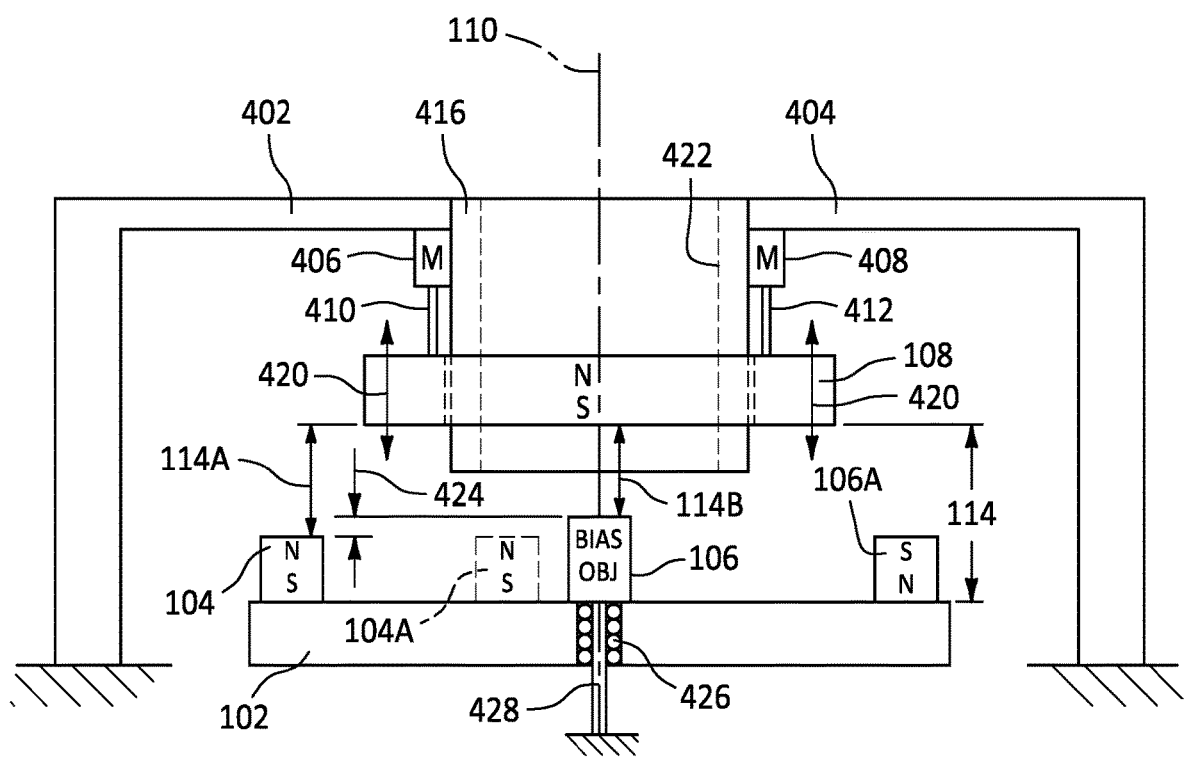
FIG. 4 is a side view of the system of FIG. 1A with a structure holding the ring magnet and allowing it to slide axially, in accordance with embodiments of the present disclosure.

Referring to FIG. 4, a side view of the system of FIG. 1A is shown having a structure with fixed arms 402, 404 which rigidly a cylinder 416 disposed within the inner diameter of the ring magnet 108, which allows the ring magnet 108 to slide axially (up and down), toward and away from the rotating body 102 and the flanking magnet 104 and bias object 106 as indicated by the arrows 420. In addition, in some embodiments, there may be motors 406, 408, e.g., linear actuators, having shafts 410,412, respectively, which are attached to opposite sides of the ring magnet structure 108 to facilitate axial movement 420 of the ring magnetic body 108. In some embodiments, the motors and shafts may be replaced by springs which support the ring magnet assembly 108.

Also, in some embodiments, the top of the bias object 106 may be higher than the top of the flanking magnet 104, as shown by a distance 424, which may provide enhanced performance. The cylinder 416 may be a solid cylinder or may be a hollow cylinder, as indicated by the axial dashed lines 422, and may be made of plastic or other non-ferrous material that does not interfere with the magnetic field causing the rotation of the body 102. Also, the rotating body 102 may rotate about a shaft 428 using a known bearing 426.

Figure 5A:
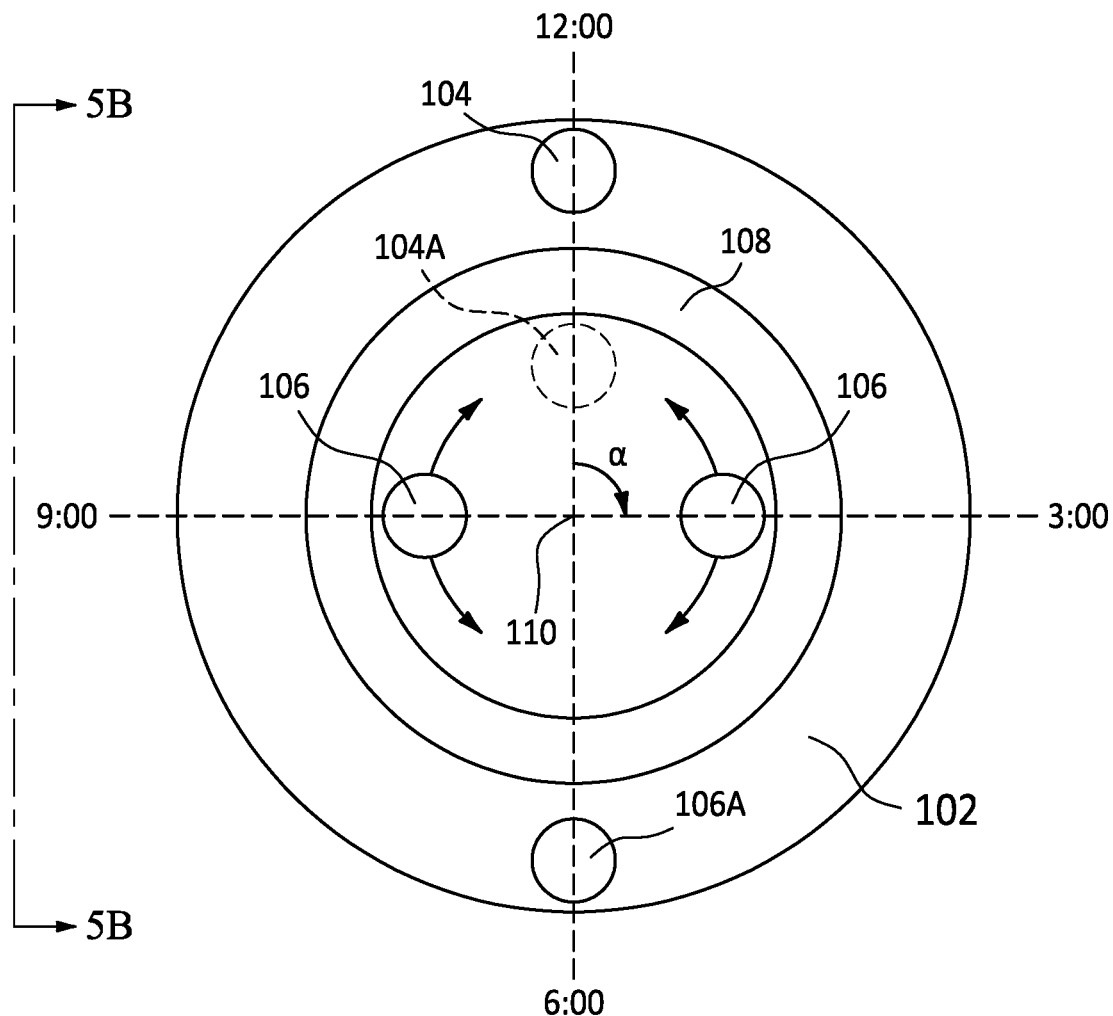
FIG. 5A is a top view of the system of FIG. 1A showing various positions of a flanking magnet and bias object around a circular motion path in relation to hands on a clock, in accordance with embodiments of the present disclosure.

Referring to FIG. 5A, a top view of the system of FIG. 1A is shown with various positions of a flanking magnet and bias object around a circular motion path in relation to time on a clock (e.g., 12:00, 3:00, 6:00, 9:00), in accordance with embodiments of the present disclosure.

Figure 5B:
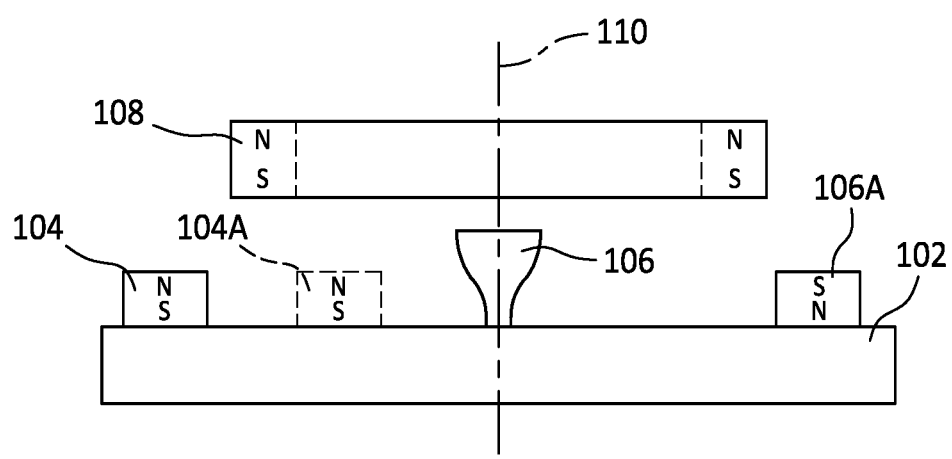
FIG. 5B is a right side view of the system of FIG. 5A showing polarities of the flanking magnet and the ring magnet, in accordance with embodiments of the present disclosure.

Referring to FIG. 5B, a right-side view of the system of FIG. 5A shows polarities of the flanking magnets 104, 104A, 106A and the ring magnet 108, in accordance with embodiments of the present disclosure, where the bias object 106 has a geometry where the upper portion is larger than the lower portion. The second flanking magnet 106A may have a different size and shape than the first flanking magnet 104, however, in some embodiments, the flanking magnet 104 and second flanking magnet 106A may have the same size and/or shape, or similar size and/or shape.

Referring to FIG. 5C, a table 510 is shown, which shows rotation direction of the rotating body based on factors such as polarities of the flanking magnet 104 and the ring magnet 108 and the position of the flanking magnet 104 and bias object 106, as shown in FIGS. 5A-5B, in accordance with embodiments of the present disclosure.

Referring to FIG. 5B, in some embodiments, the bias object 106 may be made of a polymer or elastomer material. Also, in some embodiments, the bias object 106 may have a bell or cone or other shape that has an upper surface area at the top of the bias object 106 facing the ring magnet 108, that is larger than at the bottom surface where it is attached to the rotating body. In that case, the elastomer material may provide an additional twisting action or force on the bias object 106 which is transferred to the rotating body 102.

Figure 6A:
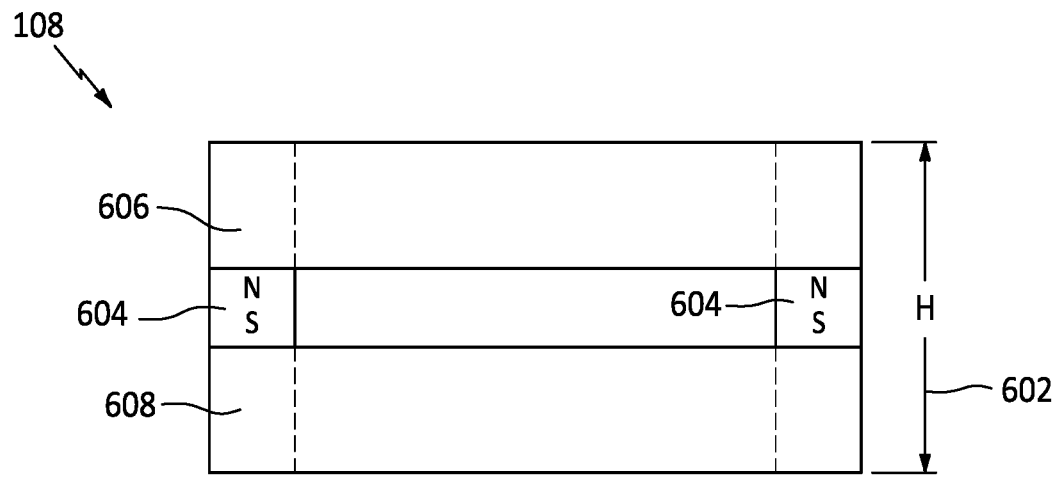
FIG. 6A is a side view of an alternative embodiment for the ring-shaped magnet or magnetic body, showing a plurality of magnets disposed between two ring-shaped ferrous bodies or steel pipes and around a perimeter of the two ring-shaped bodies, in accordance with embodiments of the present disclosure.
Figure 6B:
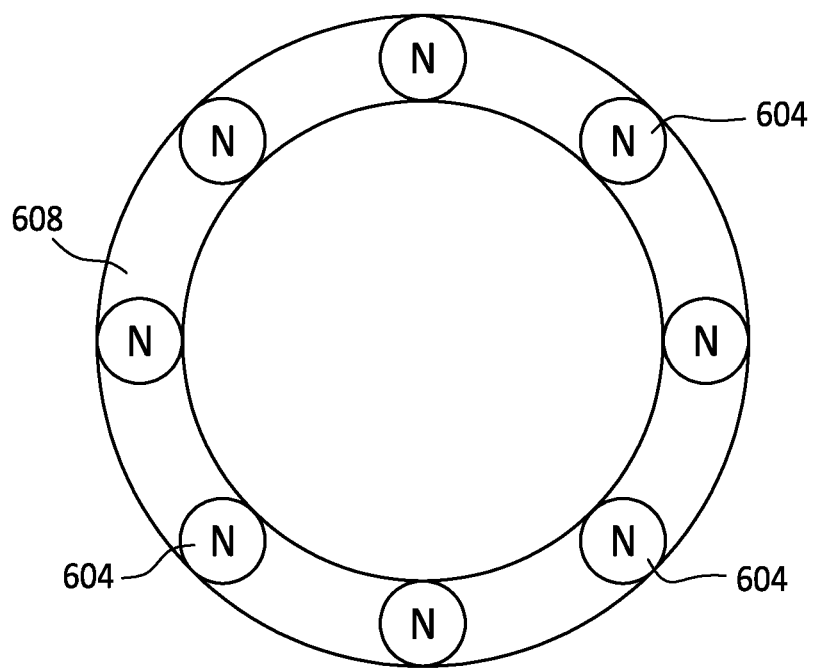
FIG. 6B is a top view of the embodiment of FIG. 6A with an upper pipe removed, showing a plurality of magnets disposed around the perimeter, in accordance with embodiments of the present disclosure.

Referring to FIG. 6A, a side view of an alternative embodiment for the ring-shaped drive magnet or drive magnetic body is shown, having a plurality of axially polarized permanent magnets disposed between two ring-shaped ferrous bodies 606, 608, e.g., steel pipes, and positioned around a perimeter of the two ring-shaped ferrous bodies 606, 608, in accordance with embodiments of the present disclosure. FIG. 6B shows a top view of the embodiment of FIG. 6A with an upper pipe removed, showing a plurality of magnets disposed around the perimeter, in accordance with embodiments of the present disclosure. Thus, in some embodiments, the drive ring magnet 108 may be a plurality of permanent magnets disposed in a circular or ring shape. Also, the drive ring magnet (or drive element or ring element) 108 may be a magnetic body or assembly having one or more of circumferentially distributed magnets, ring magnets (partial ring or complete circular ring), ring-shaped ferrous bodies, or any combination of same, which collectively provide the necessary magnetic fields to provide the function and performance described herein. When a ferrous body is used as the support for individual cylindrical magnets 604, it helps to distribute the flux field to provide a more contiguous magnetic flux field than if the magnets 604 were supported by a non-ferrous material, such as plastic.

Referring to FIG. 6A, we have found that the height H 602 (or thickness) of the ring magnet 108 (or ring-shaped magnetic body or assembly) influences the strength of the rotational magnetic forces moving the rotating body. In particular, in some embodiments, the larger the height H, the stronger the rotational magnetic forces moving the rotating body.

Figure 6C:
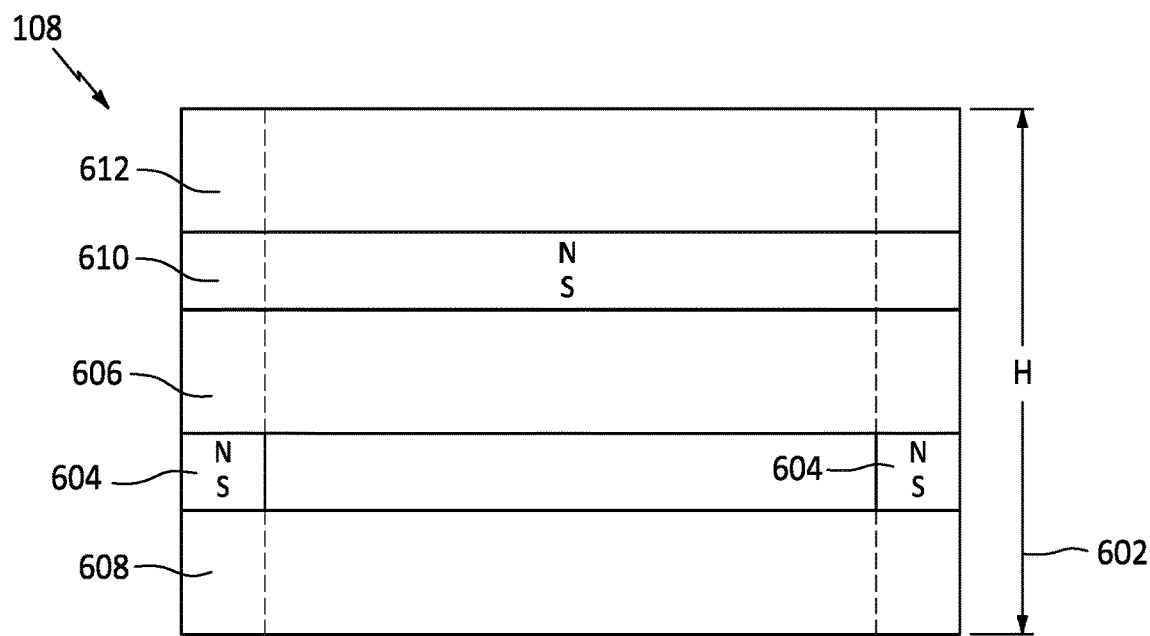
FIG. 6C shows a side view of a drive element having both a ring magnet and a plurality of cylinder magnets separated by a metal or ferrous structure such as a pipe, in accordance with embodiments of the present disclosure.

Referring to FIG. 6C, a side view is shown of a drive element 108 having both a ring magnet 610 and a plurality of cylinder magnets 604 separated by a metal or ferrous structure such as a pipe segments 608 (lower), 606 (middle), 612 (upper). The plurality of cylinder magnets 604 are distributed about a circumference of the pipe segments 606, 608 which may also correspond to the circumference and thickness of the ring magnet 610 in some embodiments. Also, in some embodiments, the cylindrical magnets 604 may be larger/smaller than the ring magnet 610 and can effectively form and/or function as a de facto second ring magnet. In some embodiments, ring magnet 610 may be made of a plurality of cylindrical magnets 604, or the plurality of magnets 804 may be replaced by another ring magnet like the ring magnet 610. When a ferrous body such as the steel pipe segments 606, 608 are used as to support the individual cylindrical magnets 604, it helps to distribute the flux field to provide a more contiguous magnetic flux field than if the magnets 604 were supported by a non-ferrous material. Also, when a ferrous body such as the steel pipe segments 606, 612 are used around the ring magnet 610, it helps provide a deeper or longer magnetic field cavity for the drive element to interact with the rotating body 102, including the bias object 106 and flanking magnet 104, 104A.

Figure 6D:
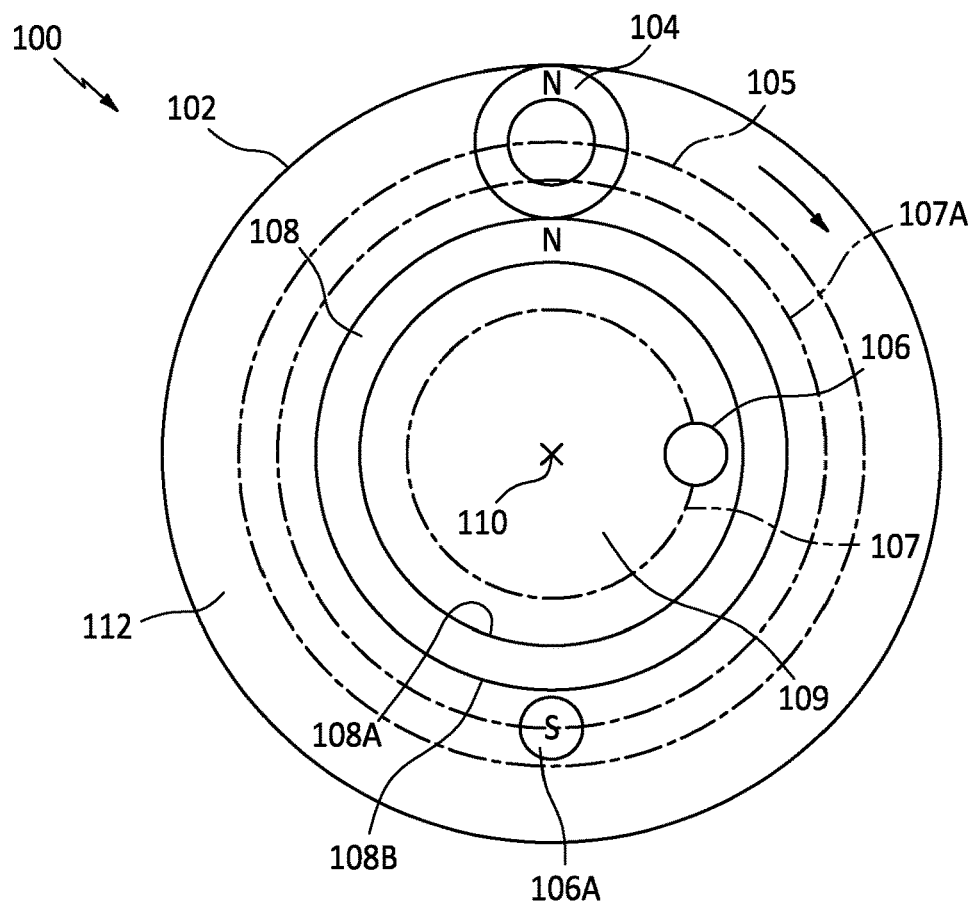
FIG. 6D shows a top view of the system where the flanking magnet is a ring magnet, in accordance with embodiments of the present disclosure.

Referring to FIG. 6D, a top view is shown of an exemplary system embodiment where the flanking magnet 104 is a ring magnet. In that case, the ring magnet may also be located within the diameter of the ring element 108 if desired, as shown in the FIGS. 1A and 3A with the flanking magnet 104A. The operation of the elements in the system to generate rotation of the rotating body is substantially similar to the operation discussed above in connection with the system 100 of FIGS. 1A-1C.

Figure 7:
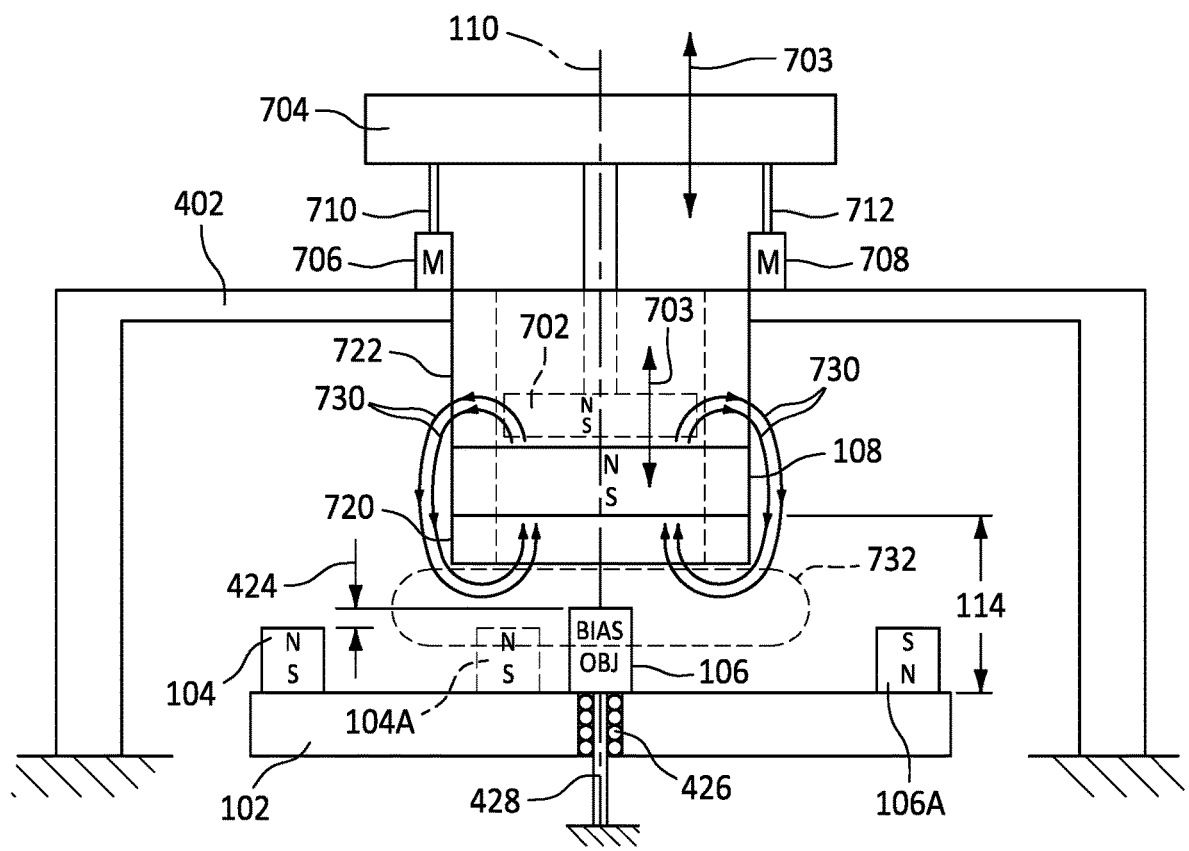
FIG. 7 shows a side view of a drive element having a ring magnet surrounded by ferrous pipe sections and a plunger mechanism having a disc magnet attached, the plunger and magnet arranged to move axially, and may be driven by motors and shafts, in accordance with embodiments of the present disclosure.

Referring to FIG. 7, a side view is shown of a drive element 108 having a ring magnet surrounded by a ferrous pipe sections 720, 722, and a plunger mechanism 704 having a disc magnet 702 attached, the plunger 704 and magnet 702 arranged to move axially as shown by the arrows 703, and may be driven by motors 706, 708 and shafts 710, 712, respectively, similar to the motors 406, 408 and shafts 410, 412 discussed in FIG. 4.

The plunger magnet 702 (of the plunger mechanism 704) has a magnetic polarity that pushes the bottom field region 732 of the magnetic field 730 (e.g., similar to a magnetic Halbach effect) toward the rotating body 102 and the flanking magnet 104, causing the body 102 to rotate faster and/or with more angular force, similar in function and operation to moving the ring magnet 108 axially (as shown in FIG. 4). In particular, for example, if the magnet 108 is polarized South facing (down) toward the rotating body 102 and North facing (up) toward the plunger magnet 702 and the plunger magnet 702 having its lower surface (facing the rotating body 102) polarized South, initially the plunger magnet will be attracted to the upper portion of ring magnet field 730, but as the plunger magnet 702 moves toward the bottom of the ring magnet 108, it pushes the magnetic field region 732 toward the rotating body 102, thereby causing the body 102 to rotate faster and/or with more angular force due to the enhance magnetic field strength near the flanking magnet. Opposite polarities may be used if desired provided it provides the desired function and performance.

In some embodiments, the plunger magnet 702 may be disposed inside a non-ferrous hollow cylinder or pipe (not shown), which is disposed within the cylindrical drive element 108. Use of the plunger 704 allows the drive element 108 to remain axially stationary. Otherwise, the operation of the elements in the system to generate rotation of the rotating body is substantially similar to the operation discussed above in connection with the system 100 of FIGS. 1A-1C.

Figure 12A:
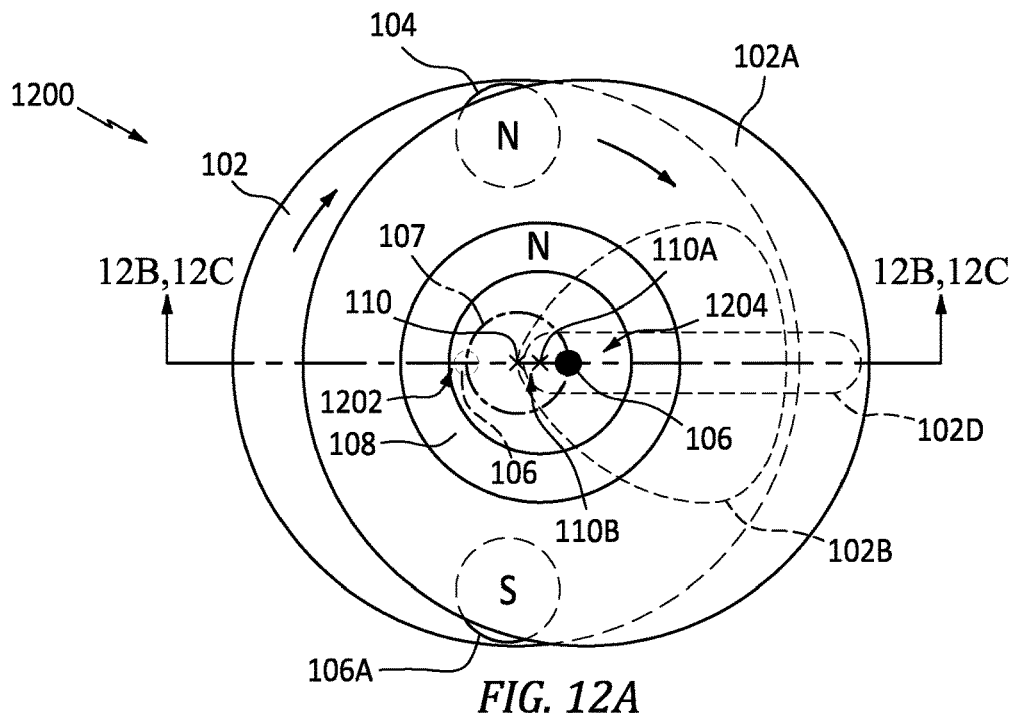
FIG. 12A is a top view of a system for generating rotation in accordance with embodiments of the present disclosure.
Figure 12B:
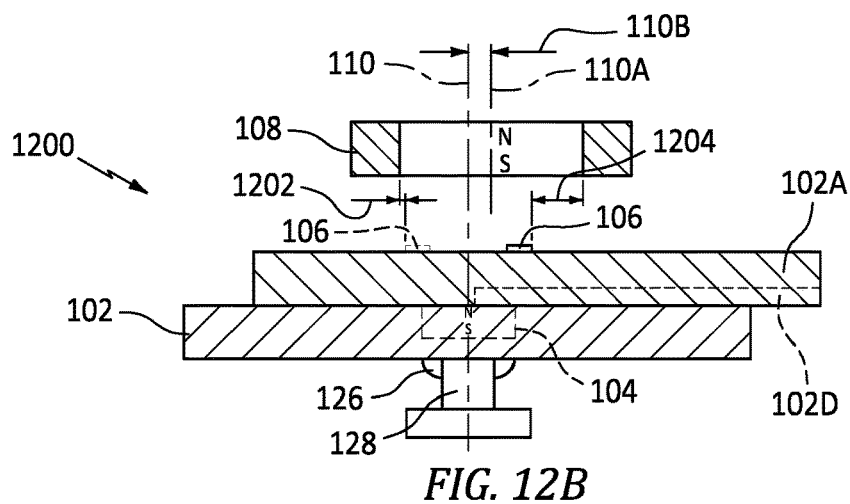
FIG. 12B is a side view of the system of FIG. 12A in accordance with embodiments of the present disclosure.
Figure 12C:
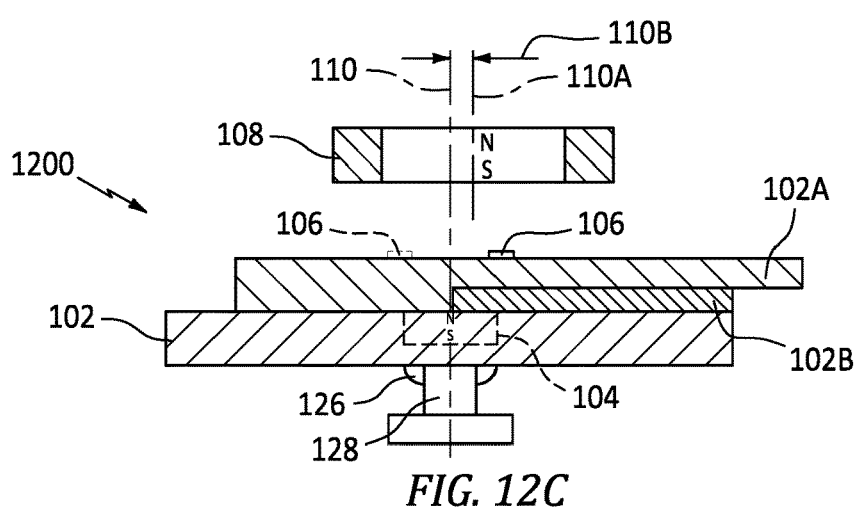
FIG. 12C is a side view of an alternative embodiment of the system of FIG. 12A in accordance with embodiments of the present disclosure.

Referring to FIGS. 8A-8E, side views are shown of various non-limiting examples bias objects 106, such as a plastic bowl (FIG. 8A), a rod or stick or dowel, e.g., made of wood or from a plant, or any other diamagnetic material, or organic material (FIG. 8B), a drop of water or hydrogel or ink or any other diamagnetic fluid or liquid (FIG. 8C) (or a small non-ferrous container with water or any other diamagnetic fluid or liquid), a piece of hemp paper (or other organic material) (FIG. 8D). As described herein, the bias object 106 may be made of a diamagnetic material for the best performance; however, other materials may be used if desired. Also, as discussed herein, the bias object 106 may be any shape or material that provides the functions described herein. Also, a ball-shaped object may be used for the bias object or any other random shape. Also, a rock or stone or any other diamagnetic mineral may also be used as for the bias object 106 if desired. FIGS. 8A-8E also show the flanking magnet 104, 104A, being located outside or inside the ring element diameter, respectively. Also, the size of the bias object may be very small, e.g., less than 1 mm in size if desired. Also, the bias object 106 may cause a localized change in the material properties of the rotating body 102. Also, we have found that any subtle change or discontinuity or non-uniformity of the material properties of the rotating body 102 may be enough to exhibit the effect shown herein. Such a change in material properties can by created by changing the thickness or geometry of the rotating body in a certain region, or adding or removing material of the rotating body in a certain region, such as making a divot 106 or hole (dashed line) 106 in the rotating body, as shown in FIG. 8E. Changing the thickness or geometry of the rotating body is also shown in FIGS. 12A, 12B, and 12C. Also, a rubber or flexible elastomer "bell-shaped" bias object (also see FIG. 5B and corresponding description) that has some vertical height above the rotating body may be used for the bias object 106.

In some embodiments, the bias object may be a freely spinning object, such as a plastic spinner, having a spinner base disposed on the rotating body, a spinner rotation shaft, and a spinner rotation hub, which rotates about the spinner rotation shaft, e.g., a small personal computer fan with fan blades or fins removed or any other freely spinning body. The spinner shaft may be arranged parallel to the rotation axis 110 of the rotating body 102. The spinner may be made of plastic with plastic or metal bearing s, or other materials described herein for the bias object. Also, an additional bias object material may be disposed on top of the spinning bias object, such as one or more of: a flat rubber washer (or other compliant material), a rock, a stick, plastic bowl, or one or more of any of the other materials discussed herein for the bias object 106. The additional bias object may be centered directly over the shaft or off-center from the shaft of the spinner. In some embodiments, the rotation or spin of the spinner bias object on the rotating body may enhance the rotational speed of, or rotational forces on, the rotating body 102.

Also, the bias object 106 may extend into the hollow cavity of the drive element 108 (for a cylindrical drive element), e.g., as shown in FIG. 8B. For example, a wooden dowel about 4 inches long with a diameter of about ½ in, or a wooden or plant or tree stick about 6 inches long with a diameter of about 1-3 mm, may be used. Any other elongated or rod-shaped or other shaped objects that extend toward or into the hollow cavity of the drive element 108 may be used if desired. It has been found that the further the bias object 106 extends into the drive element cavity 108, the more rotational speed and/or rotational force is generated by the system. In the case of a plastic bowl-shaped bias object 106 (FIG. 8A), the bowl may be 4-5 inches diameter and 3-4 inches deep, and the bowl may be taller than the flanking magnet 104 and/or may extend over the flanking magnet 104, 104A. Other dimensions may be used if desired.

Figure 9A:
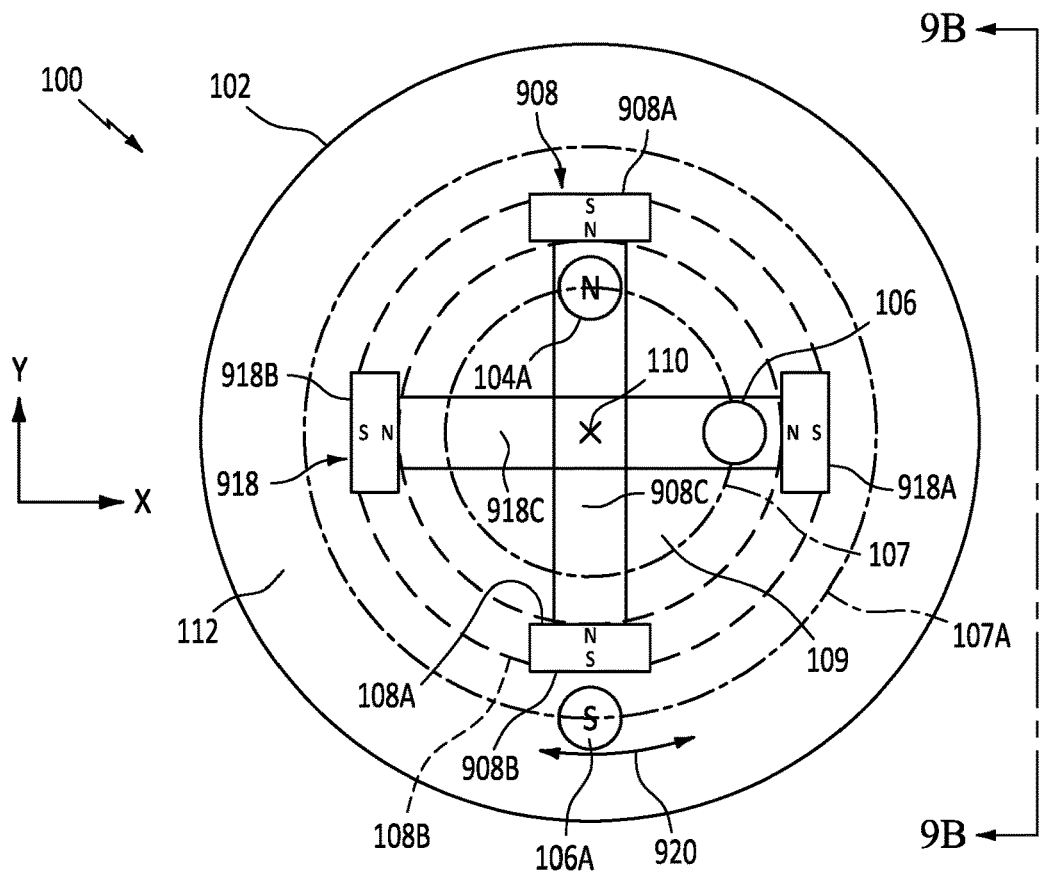
FIG. 9A shows a top view of a "dumbbell" shaped drive element, in accordance with embodiments of the present disclosure.
Figure 9B:
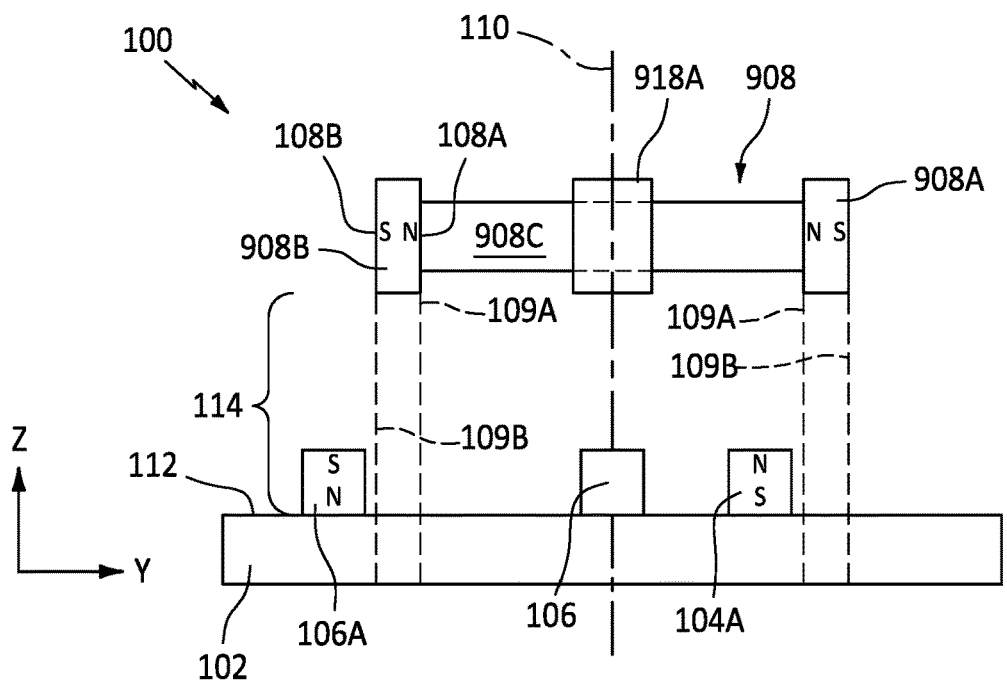
FIG. 9B shows a side view of the embodiment of FIG. 9A, in accordance with embodiments of the present disclosure.

Referring to FIGS. 9A and 9B, top and side views are shown, respectively, of a "dumbbell" shaped drive element. In this embodiment, the two dumbbells 908, 918 are arranged perpendicular to each other, each having a ferrous body shaft 908C, 918C, and magnets 908A, 908B and 918A, 918B attached to the respective shafts 908C, 918C. Also, the magnets 908A, 908B and 918A, 918B are radially polarized and the flanking magnet 104 is positioned to be inside the ring element inner diameter (or rotational travel path) 108A and travels the same path 107 as the bias object 106. In some embodiments, a single dumbbell may be used or more than two dumbbells may be used. Also, if the polarity of the magnets on the dumbbells 908, 918 are reversed, or the polarity of the flanking magnet 104, 104A is reversed, the body 102 will spin or rotate in the opposite direction during operation.

In some embodiments, instead of having a "dumbbell" shaft holding the radially magnetized magnets 908A, 908B, 908C, 908D, the magnets may be arranged in a circular pattern using any circular structure for support, such as being attached to or disposed in, on, or inside the ID or OD of a cylindrical ferrous body, such as a steel pipe. Also, in some embodiments, the magnets 908A, 908B, 908C, 908D may be held in position by a non-ferrous body structure, such as a plastic pipe or the like (e.g., for a "dumbbell" shaped or cylindrical structure support). Also, in some embodiments, the drive element may be a ring magnet that is magnetized radially instead of axially. When a ferrous body is used as the support it helps to distribute the flux to provide a contiguous magnetic field, similar to that as describe with FIGS. 6A and 6C.

Referring to FIGS. 10A and 10B, alternative embodiments for FIGS. 4 and 7, respectively are shown, where the rotating body or plate or flywheel 102 is mechanically connected to and drives a shaft 1002 which is mechanically connected to and drives the rotor of a known alternator or electrical generator 1004 that converts mechanical energy (rotating shaft) into electrical energy or electrical output power in the form of an alternating output current and/or output voltage Vout on lines 1006 which may be connected to an electrical load 1008. The electrical load 1008 may be any electrical load, circuit, or device (or machine or equipment) that uses electrical power to operate the device, or to charge batteries or capacitors or other electrical storage devices. In some embodiments, there may be a computer-based controller 1020 which controls the height 114A of the drive element 108 based on a feedback signal from the alternator indicative of output voltage Vout, output current or output power.

Figure 11A:
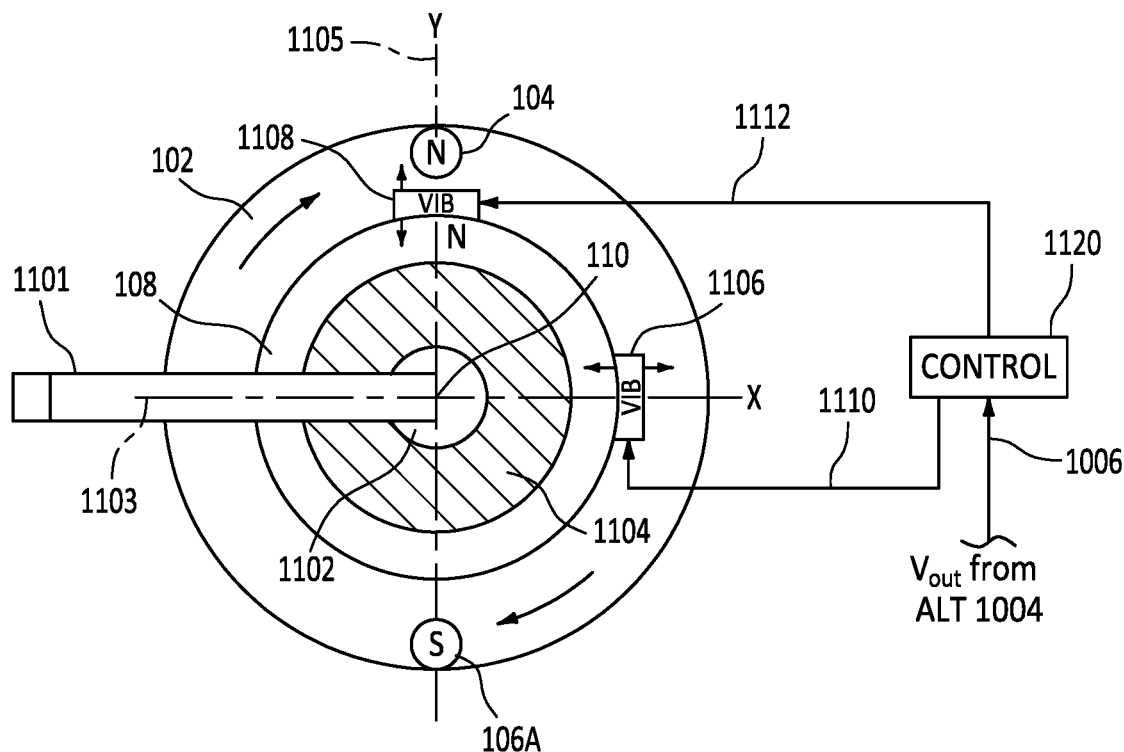
FIG. 11A shows a top view of the system of FIG. 10A or FIG. 10B where the drive element is mounted to a flexible material to allow for flexible lateral motion and to allow control of a lateral vibration input, in accordance with embodiments of the present disclosure.
Figure 11B:
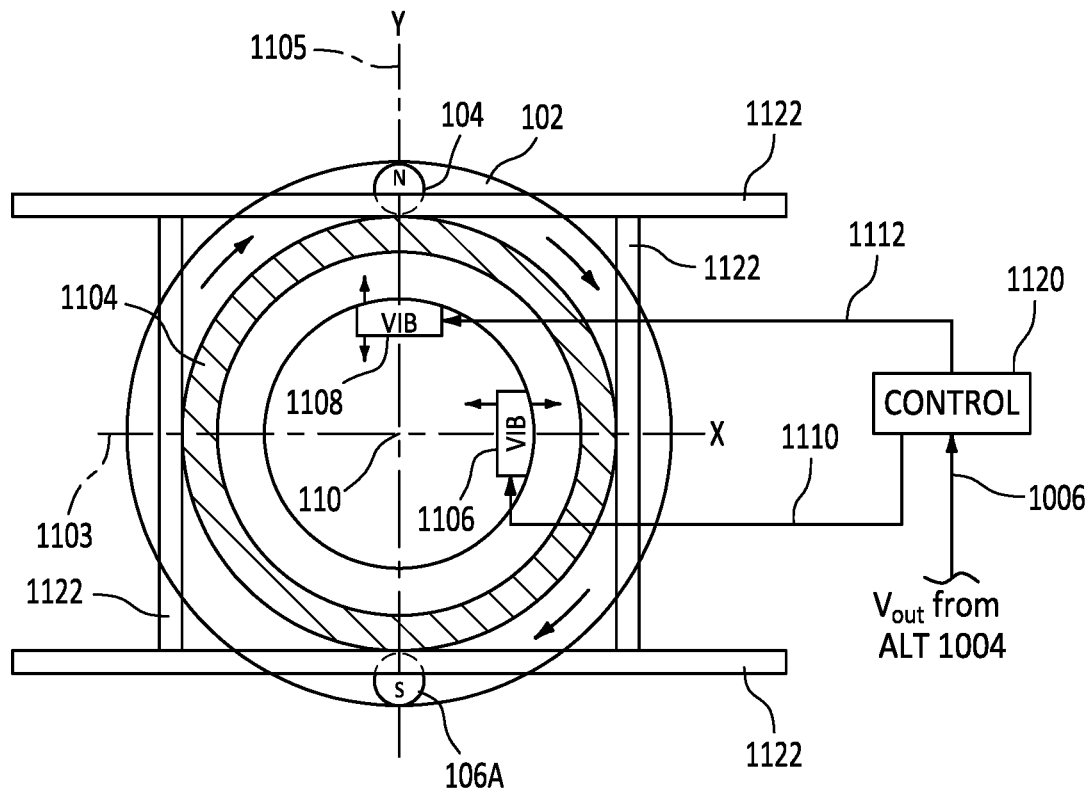
FIG. 11B shows a top view of an alternative embodiment of the FIG. 11A where the drive element is mounted to a flexible material to allow for flexible lateral motion and to allow control of a lateral vibration input, in accordance with embodiments of the present disclosure.
Figure 11C:
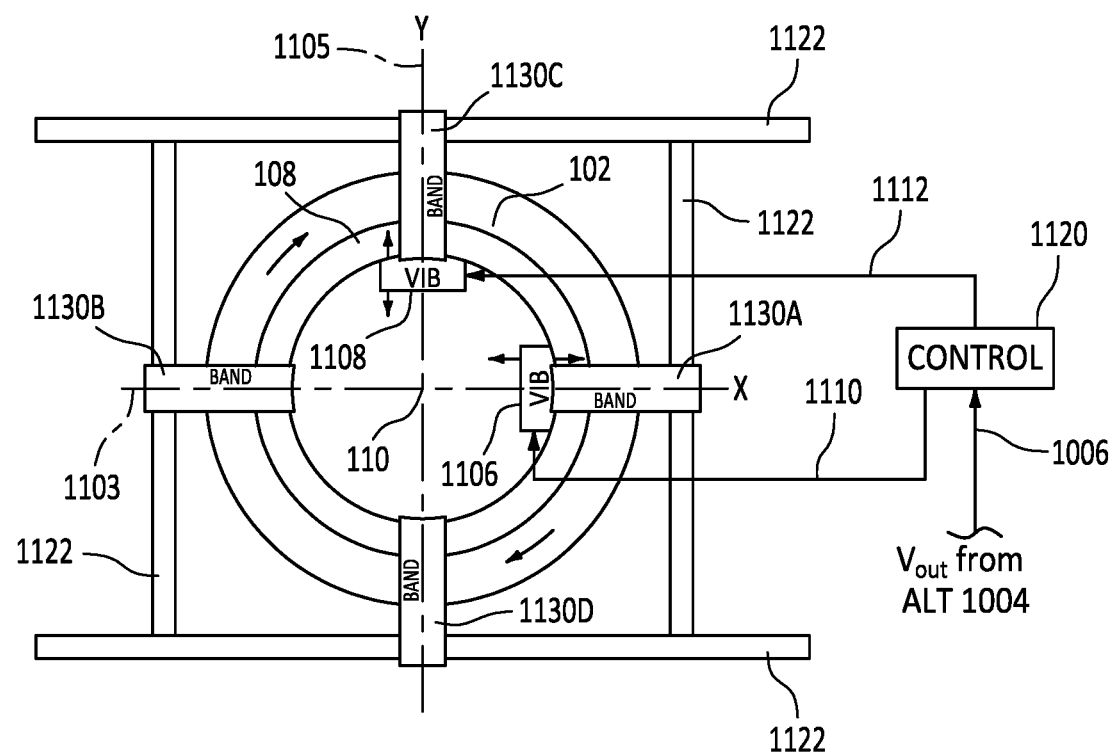
FIG. 11C shows a top view of an alternative embodiment of the FIG. 11A where the drive element is supported by a flexible or elastic material/structure to allow for flexible lateral motion and to allow control of a lateral vibration input, in accordance with embodiments of the present disclosure.

Referring to FIGS. 11A, 11B, and 11C, in some embodiments, the drive element 108 may be house in (or surrounded by) or supported by or floated within, a rubber or elastic or other flexible (or compliant or pliable) material to allow for lateral or radial motion of the drive element. This allows the drive element to oscillate or move radially in response to magnetic forces from the rotating body. Such a configuration may be viewed as a magnetically driven resonance system or circuit, where rotation of the rotating body causes radial oscillation of the drive magnet, and vice versa, in a resonating configuration. Also, in some embodiments, the rubber housing may be configured to be stiffened, e.g., by introducing an electric or magnetic field into the rubber, thereby causing a perturbation into the system, which may cause the resonance conditions to be continued, initiated or restarted, e.g., like an impulse input or other form of excitation input to the system. In some embodiments, there may be one or more actuators 1106, 1108 that applies force or vibration directly or indirectly to the ring drive element 108. The actuators 1106, 1108 used to laterally drive the ring drive magnet 108 may be driven by a controller 1120, which measures the output power (or voltage or current) generated by the system and determines the appropriate amount of oscillation frequency of lateral force to be applied to the ring drive magnet 108 to sustain rotation of the body at the desired rate or power output.

Regarding controlling the system rotation, to start or to increase the speed of the rotating body 102, the controller drive the actuators move the suspended ring drive magnet 108 in an orbital (or circular) fashion in the direction of the rotating bottom plate 102, analogous to an orbital sander. Conversely, to slow down the rotation of the body 102 or to brake the system, the controller drives the actuators to move the suspended ring drive magnet 108 in an orbital fashion in the opposite direction to rotation of the body 102. Such a control is simple and effective control mechanism to control the system. The orbital motion required by the drive magnet is extremely small; thus, the control system will likely require very little input energy. Thus, the present disclosure converts potential energy in the permanent ring drive magnet and flanking magnets into kinetic energy of the rotating plate (and attached shaft), and mechanical work, by inputting a very small disturbance into the system and controlling it over time to sustain rotation and energy generation using a small amount of input energy. In particular, magnetic field interaction between the permanent magnet ring drive element, the first flanking magnet, the second flanking magnet, and the bias object appear to create an instability, asymmetry or non-linear effect, which causes the body 102 to rotate about the rotation axis 110. The rotation of the body (and any shaft connected thereto) may be sustained and/or controlled over time using one or more controllers 1020,1120 (or control system) as described herein, which controls the lateral and/or vertical position (or gap) of the drive element 108 using a small amount input energy, thereby providing clean sustainable energy generation which may help to reduce climate change.

In particular, FIGS. 11A, 11B, and 11C show various embodiments for mounting or housing the drive element or magnet 108 while allowing for flexible lateral motion of the drive element 108 is shown. Referring to FIG. 11A, the inner diameter of the drive element 108 is partially (or completely) filled with a flexible or elastomer material 1104, to allow for flexible lateral movement of the drive element 108. In that case, there may be a support post 1102 in the center (or off to a side) and a support structure 1101 which supports the drive element 108 and holds it in position vertically over the rotating body 102. In some embodiments, there may be a computer-based controller 1120 which controls or drives the lateral vibration actuators 1106, 1108 attached to the drive element 108 to control lateral movement along X and Y axes, 1103, 1105, respectively, based on a feedback signal from the alternator indicative of output voltage Vout, output current or output power from the alternator.

Referring to FIG. 11B, the outer diameter of the drive element 108 is surrounded with the flexible or elastomer material 1104 to allow for flexible lateral movement of the drive element 108. In that case, there may be a support beams 1122 that supports the drive element 108 through the elastomer material 1104 and holds it in position vertically over the rotating body 102. In some embodiments, there may be the computer-based controller 1120 which controls lateral vibration actuators 1106, 1108, attached to the drive element 108 to control lateral movement along X and Y axes, 1103, 1105, respectively, based on feedback from the alternator output voltage Vout.

Referring to FIG. 11C, the drive element 108 is attached to support beams 1122 with the flexible or elastomer or elastic material or structure or bands (e.g., rubber bands or springs or the like) 1130A, 1130B, 1130C, 1130D, along X and Y axes, to allow for flexible lateral movement of the drive element 108. In that case, the support beams 1122 support the drive element 108 through the bands 1130A, 1130B, 1130C, 1130D and hold it in position vertically over the rotating body 102. In some embodiments, there may be the computer-based controller 1120 which controls known lateral vibration actuators 1106, 1108, attached to the drive element 108 to control lateral movement along X and Y axes, 1103, 1105, respectively, based on a feedback signal from the alternator output voltage Vout or current. In some embodiments, the lateral actuators 1103, 1105 may be motors or linear actuators, such as the motors 406, 408, 710, 712, shown in FIGS. 4 and 7, to control or adjust the lateral position of the drive element 108.

Referring to FIGS. 12A and 12B, top and side views are shown (side view rotated 90° from top view), respectively, of an exemplary "offset plate" embodiment of a system 1200 for generating rotation in accordance with embodiments of the present disclosure. In the shown embodiment, the system 1200 includes a two rotating bodies 102, 102A. A first rotating body 102 of the rotating bodies 102, 102A includes a shaft 128 mounted to a center point of the rotating body 102. The shaft 128 is mounted through a bearing mount 126. A second rotating body 102A of the rotating bodies 102, 102A is rigidly connected to the first rotating body 102, but is offset from the first rotating body 102 such that the center of the second rotating body 102A is not aligned with the center of the first rotating body 102. The rotating body 102 is configured to rotate about a rotation axis 110 extending through the shaft 128. The system 1200 includes two flanking magnets 104, 106A arranged on and/or within the first rotating body 102 and a bias object (e.g. similar to the bias object 106 discussed herein above in connection with other embodiments) and/or any discontinuity or change in the material properties of the rotating body in the plane of the first or second rotating bodies 102 or 102A, located at a position relative to the flanking magnets 104, 106A similar to that discussed herein for the bias object angle alpha measured from the flaking magnet (e.g., at least at about 90 deg or about 270 deg for the angle alpha measured from the flaking magnet 104 defined herein above for optimal performance, or the "Clymer Triangle"). Other angles for bias angle alpha may be used as discussed herein, depending on the desired function and performance.

The central location of the bias object or change in material properties of the rotating bodies 102 or 102A (collectively referred to herein as the bias material 106), defines a bias point on or within the rotating body 102A from where the angle alpha may be measured. In some embodiments, the discontinuity or change in the material properties of the rotating body can be as simple as a hole or a dimple in the top surface of the second rotating body 102A, i.e. an absence of material of the rotating body 102A in what would otherwise be a uniform plate-like structure, such as the dimple 106 shown in FIG. 8E. Also, the bias object or bias material 106, may be disposed on the surface of, or embedded partially or completely within, the rotating bodies 102 or 102A, and may be integral to the material of the rotating body, providing a change in the material properties of the bodies 102 or 102A in the region or location where the bias object is located. In general, the bias object 106 attached to a rotating body when looked at as a single body, may be considered herein as a change or discontinuity in the material properties of the rotating body in the region or area where the bias object is attached to the rotating body. Similarly, a change in the thickness of the rotating body may also be considered herein as a change or discontinuity in the material properties of the rotating body in the region or area where the change in thickness of the rotating body. Accordingly, the bias object or bias material or the change or discontinuity or non-uniformity in the material properties of the rotating body, may be collectively referred to herein as the bias object or bias material 106. Also, as described herein above with other embodiments, the bias object or bias material 106 may be various different sizes, shapes and materials. The center of the bias object or bias material 106 may be considered the "bias point" (for measuring the angle alpha) and the outer perimeter shape of the bias material 106 may be referred to herein as the "bias region", within which the material properties of the rotating body are changed or altered from the material properties of rest of the rotating body. The rotating bodies 102, 102A may be made of wood, plastic, metal or any other material.

The system 1200 further includes a drive ring magnet 108. Like other embodiments disclosed herein, the ring drive magnet 108 is axially magnetized with a bottom side facing the rotating bodies 102, 102A having a one polarity, and a top side facing away from the rotating bodies 102, 102A having an opposite polarity. Also, the center 110B drive ring magnet 108 is offset from (or not aligned with) the rotation axis 110, which creates a non-uniform gap between the bias object and the inner diameter wall of the drive ring magnet during rotation of the bodies 102, 102A (discussed more hereinafter).

The arrangement of the flanking magnets 104, 106A and/or the location/size of the ring drive magnet 108 are configured such that the flanking magnets 104, 106A are outside the perimeter (or outer diameter) of the ring drive magnet 108 when viewed from a top view (or planar view), and have polarities opposite to each other, similar to that discussed herein with other embodiments.

In operation of the system 1200, the bias object or material change 106 (or at least a portion thereof) rotates within and/or is maintained within the ring opening zone of the ring drive magnet 108, i.e. within the inner diameter of the ring drive magnet 108, when viewed from a top view (or planar view). The arrangement of the flanking magnets 104, 106A on diametrical opposite sides of the ring drive magnet 108 (and outside the perimeter as discussed above) and the presence of the bias material or material change 106 within the ring opening zone of the ring drive magnet 108 causes rotation of the rotating bodies 102, 102A when the ring drive element 108 is brought sufficiently close to the rotating bodies 102, 102A in an axial direction. Because the center (or center axis) 110A of the drive ring magnet 108 is offset from the rotation axis 110, the gap 1204 between the bias object 106 and the inner diameter of the ring drive magnet 108 constantly changes as the bias object 106 rotates around the axis 110. In particular, when the bias object 106 is at the location shown by the solid circle 106 in FIG. 12A, the gap 1024 is the largest, and when the bias object 106 is at the location shown by the dashed circle 106, the gap 1022 is smallest. Such a non-uniform rotational gap 1022,1024 creates varying radial forces by the ring drive magnet 108 on the bias object 106 and the rotating body 102, 102 during rotation, which may act like an orbital sling shot effect and which may assist in maintaining rotation of the rotating body 102, 102A.

Referring to FIGS. 12A and 12B, in some embodiments, the second rotating body may be viewed as a large bias object located on the first rotating body 102. Also, in some embodiments, the second rotating body may be made of the same material as the first rotating body 102, e.g., wood, plastic, metal or other rigid material strong enough to support the flanking magnets and the bias object. In some embodiments, the second rotating body may be a circular piece of hemp paper or other thin diamagnetic material. Also, in some embodiments, the second rotating body may be a piece of hemp paper or other thin diamagnetic material having the shape of the body 102A or having oblong shape 102B, or a long narrow shape 102D. Also, in some embodiments, the center axis 110A of the ring drive magnet 108 may be aligned with the rotation axis 110 (i.e., no offset distance).

Referring to FIG. 12C, in some embodiments, the rotating body 102, 102A may be a multi-layer or "sandwich" structure, such as two layers of hemp paper, comprising a lower layer 102B of hemp paper having an oblong shape, and a second layer 102A of hemp paper on top of the first layer which hangs over the edge of the rotating body.

Also, in some embodiments, the second rotating body may be made of the same material as the first rotating body 102, e.g., wood, plastic, metal or other rigid material strong enough to support the flanking magnets and the bias object. In some embodiments, the two bodies 102, 102A may be made of different materials.

Figure 13A:
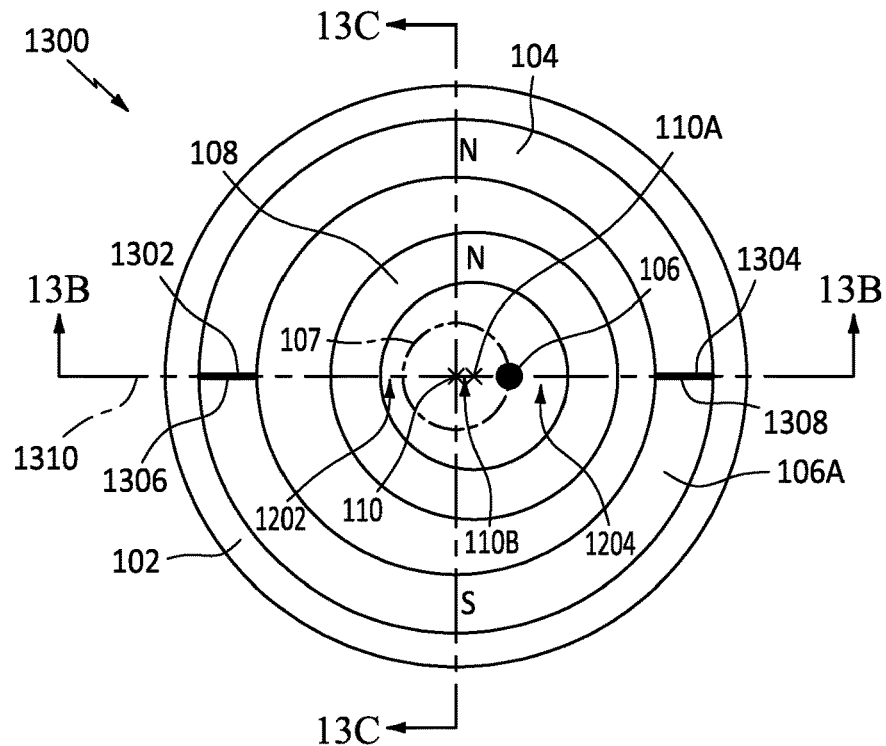
FIG. 13A is a top view of a system for generating rotation in accordance with embodiments of the present disclosure.
Figure 13B:
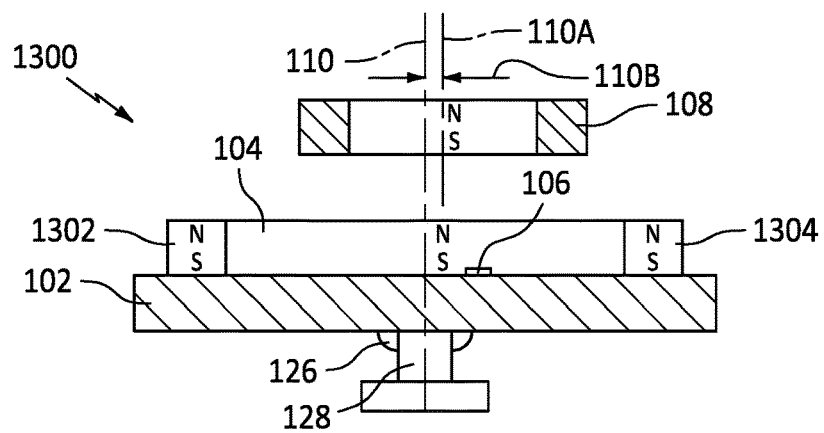
FIG. 13B is a side view of the system of FIG. 13A in accordance with embodiments of the present disclosure.
Figure 13C:
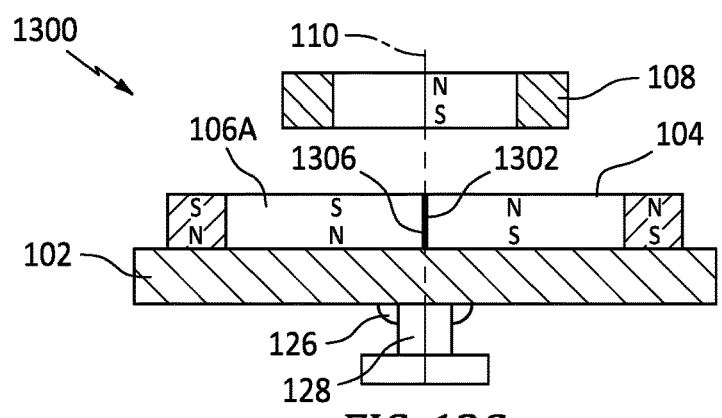
FIG. 13C is a side view of the system of FIG. 13A in accordance with embodiments of the present disclosure.

Referring to FIGS. 13A-13C, top and side view diagrams of an axially bipolar flanking magnet system 1300 embodiment is shown in accordance with embodiments of the present disclosure. In the shown embodiment, the system 1300 includes a rotating body 102, axially bipolar flanking ring magnets 104, 106A arranged on and/or within the rotating body 102, a bias object or material 106 and a ring drive magnet 108.

The axially bipolar flanking ring magnets 104, 106A are axially bipolarized such that one portion (or half ring) of each magnet 104, 106A facing away from the rotating body 102 has one polarity and another portion (or half ring) of the magnet 104, 106A facing away from the rotating body 102 has an opposite polarity, however, the flanking magnets 104, 106A show opposite polarities for each direction, i.e. one flanking magnet 104, 106A shows one polarity facing away from the rotating body 102 (e.g. north) and the other flanking magnet 104, 106A shows the opposite polarity facing away from the rotating body 102 (e.g. south). The flanking magnets 104, 106A may be joined together (as shown in FIGS. 13A-13A) along an X axis line 1310 (or polarization line or equator), which defines the change in the polarization, or may be an integral single magnet that possesses the same polarization characteristics. In some embodiments, there may be a gap between the flanking magnets 104, 106A along the line 1310. In the case where two magnets are used, the flanking magnet 104 may have end faces 1302,1304, and the flanking magnet 106A may have end faces 1306,1308. During operation, the bias object 106 rotates within the inner diameter of the ring drive magnet 108, and the ring drive magnet 108 remains within inner diameter of the rotating body 102 base plate. The ring drive magnet 108 is maintained such that a center point (or center axis) 110A of the inner region of the ring drive magnet 108 is not aligned with a rotational axis 110 of the rotating body 102, i.e. the center 110A of the ring drive magnet 108 is offset from the central rotational axis 110 of the rotating body 102 when viewed in a top view (planar view), shown as an offset distance 110B. The offset drive ring magnet 108 causes the bias object 106 to rotate along the path 107 which exhibits a varying gap 1202,1204 between the bias object 106 and the inner diameter of the drive ring element 108, as the bias object 106 (and the rotating body 102) rotate about the rotation axis 110, similar to that described with FIGS. 12A-12C.

Figure 14A:
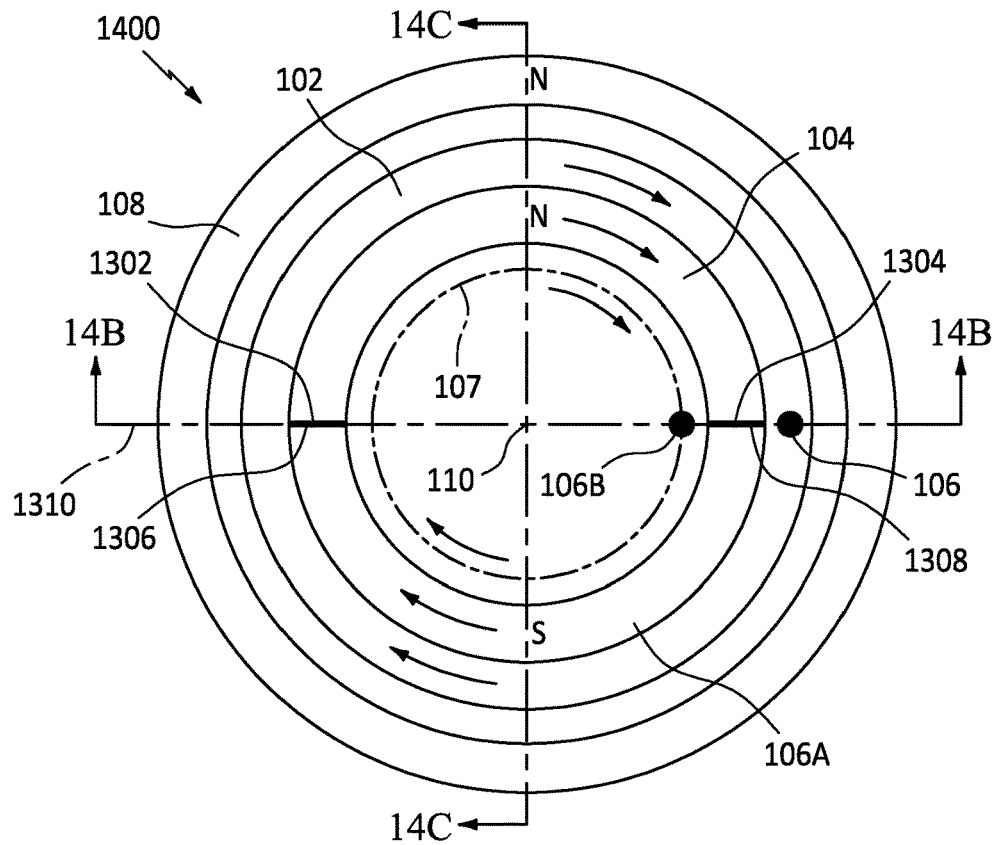
FIG. 14A is a top view of a system for generating rotation in accordance with embodiments of the present disclosure.
Figure 14B:
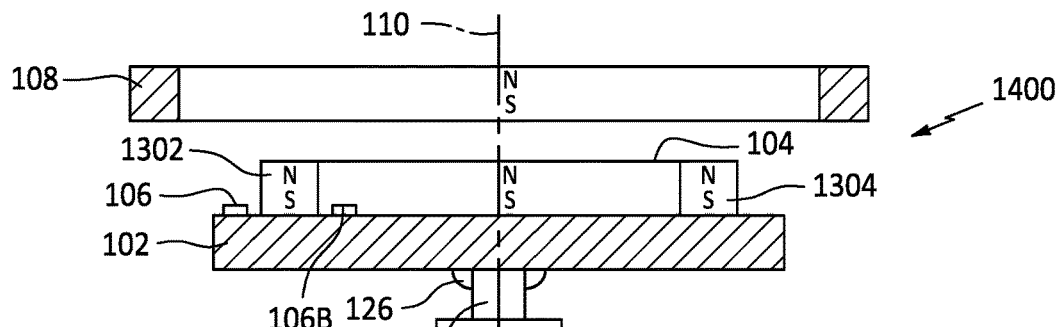
FIG. 14B is a side view of the system of FIG. 14A in accordance with embodiments of the present disclosure.
Figure 14C:
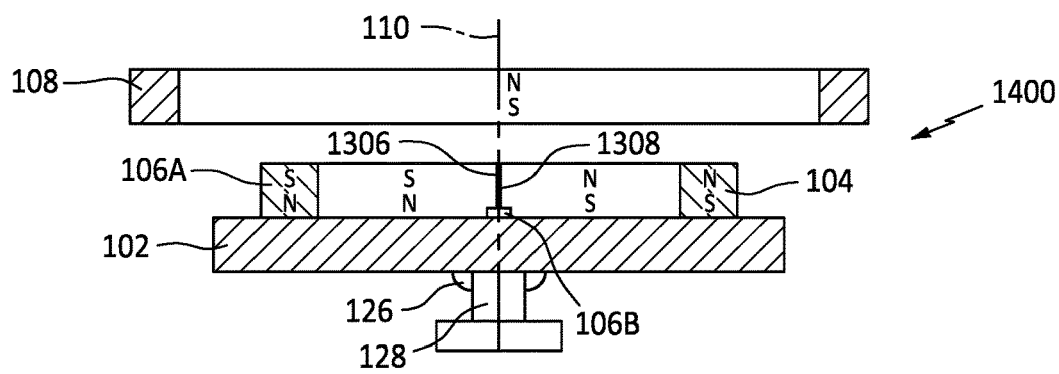
FIG. 14C is a side view of the system of FIG. 14A in accordance with embodiments of the present disclosure.

Referring to FIGS. 14A-14C, top and side view diagrams of an alternative axially bipolar flanking ring magnet system 1400 embodiment is shown in accordance with embodiments of the present disclosure. In the shown embodiment, the system 1400 includes a rotating body 102, axially bipolar flanking ring magnets 104, 106A (similar to the magnets 104, 106A of FIG. 13A), arranged on and/or within the rotating body 102, two bias objects 106, 106B and a ring drive magnet 108 having an inner diameter larger than the rotating body 102. During operation, one bias object 106B is arranged within an inner diameter (or inner region, i.e. area between the magnets 104, 106A)) of the axially bipolar flanking ring magnets 104, 106A and one bias object 106 outside of an outer diameter (or outer region, i.e. area outside the perimeter of the magnets) of the axially bipolar flanking ring magnets 104, 106A, when viewed from a top view (or planar view). During operation, both bias objects 106, 106B are arranged within an inner diameter of the ring drive magnet 108, when viewed from a top view (or planar view). In addition, in some embodiments, the outer diameter of the rotating body 102 is within the inner diameter of the drive ring magnet 108.

The system 1300 further includes a drive ring magnet 108. Like other embodiments disclosed herein, the ring drive magnet 108 is axially magnetized with a bottom side facing the rotating bodies 102, 102A having a one polarity, and a top side facing away from the rotating bodies 102, 102A having an opposite polarity. Also, the ring drive magnet 108 has a larger outer diameter than the outer diameter (or outer region) of the axially bipolar flanking magnets 104, 106A and larger than the outer edge of the rotating body 102.

The axially bipolar flanking magnets 104, 106A are axially bipolarized such that one portion of each magnet 104, 106A facing away from the rotating body 102 has one polarity and another portion of the magnet 104, 106A facing towards from the rotating body 102 has an opposite polarity. The flanking magnets 104, 106A may be joined together (as shown in FIGS. 13A-13A) along an X axis line 1310 (or polarization line or equator), which defines the change in the polarization or may be an integral single magnet that possesses the same polarization characteristics. In some embodiments, there may be a gap between the flanking magnets 104, 106A. In the case where two separate (half circle or U shaped) magnets are used, the U-shaped flanking magnet 104 may have end faces 1302,1304, and the U-shaped flanking magnet 106A may have end faces 1306, 1308.

In preferred embodiments, during operation a bias object 106 is arranged outside of the outer diameter (or outer region) of the axially bipolar flanking magnets 104, 106A. Alternatively, in some embodiments the bias object 106B is arranged within the inner diameter (or inner region) of the axially bipolar flanking magnets 104, 106A. In some embodiments, both bias objects 106, 106B are arranged as shown in FIG. 14A.

Figure 15A:
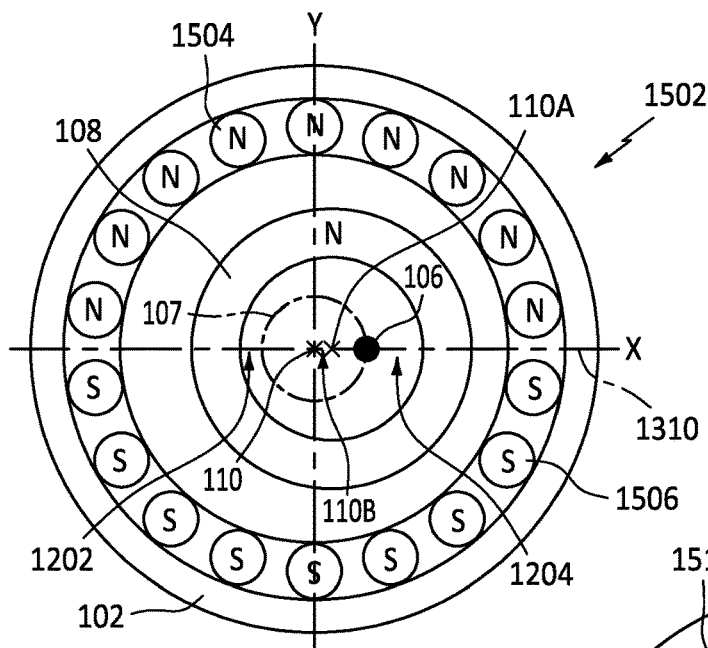
FIG. 15A is a top view of an alternative embodiment for FIG. 13A for a system for generating rotation in accordance with embodiments of the present disclosure.
Figure 15B:
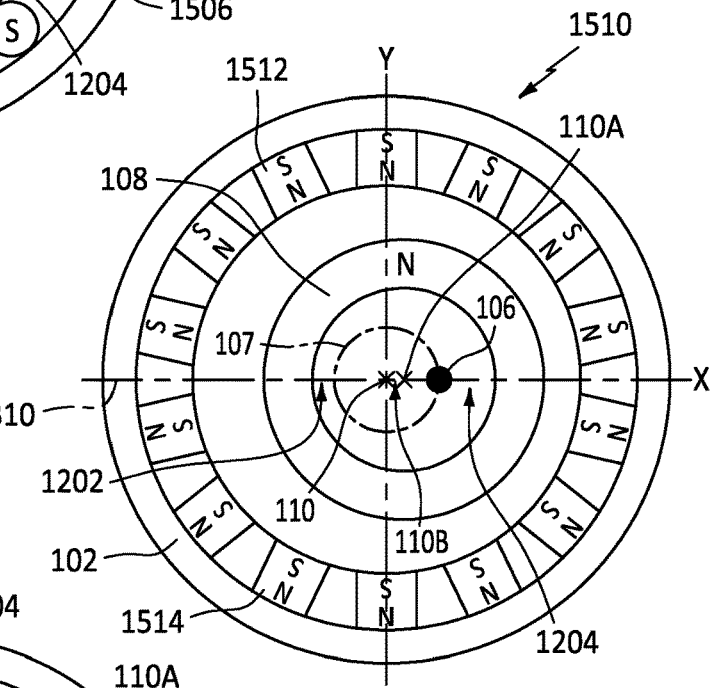
FIG. 15B is a top view of an alternative embodiment for FIG. 13A for a system for generating rotation in accordance with embodiments of the present disclosure.
Figure 15C:
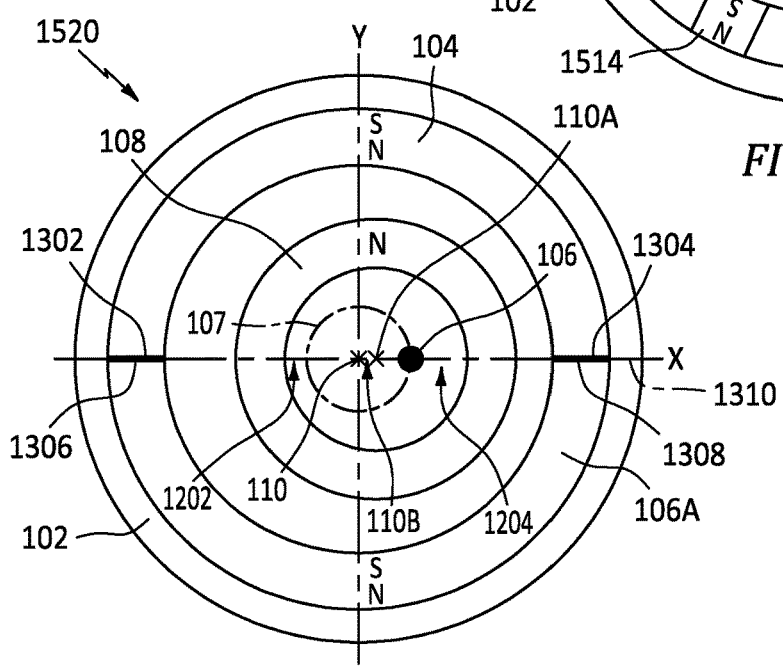
FIG. 15C is a top view of an alternative embodiment for FIG. 13A for a system for generating rotation in accordance with embodiments of the present disclosure.

Referring to FIGS. 15A-15C, alternative embodiments, 1502, 1510, 1020, respectively, to the axial bipolar flanking magnets 104, 106A are shown. Referring to FIG. 15A, instead of using a single bipolar magnet or two half circle (or U-shaped) magnets 104, 106A, a plurality of individual magnets may be used for each half of the bipolar magnet. In particular, the North side facing up on the bipolar flanking magnet 104, may be replaced by a plurality of smaller axially polarized cylindrical or disk magnets 1504 with the same polarity N facing up, and the South side facing up on the bipolar flanking magnet 106A, may be replaced by a plurality of smaller axially polarized cylindrical or disk magnets 1506 with the same polarity S facing up, where the two polarities are symmetrical around an X axis line 1310 (or polarization line or equator), which defines the change in the polarization. Referring to FIG. 15C, in some embodiments, instead of using an axially polarized bipolar magnet or two half circle (or U-shaped) magnets 104, 106A, the bipolar flanking magnets 104, 106A may be polarized radially, as shown in the embodiment 1520 in FIG. 15C.

Referring to FIG. 15B, instead of using a single radially polarized bipolar magnet or two half circle (or U-shaped) flanking magnets 104, 106A, as shown in FIG. 15C, a plurality of individual magnets may be used for each half of the radially polarized bipolar magnet. In particular, the North side facing inward and South side facing outward on the radially polarized bipolar flanking magnet 104 may be replaced by a plurality of smaller radially polarized cylindrical or disk or rectangular or square (or other shaped) magnets 1512 with the same polarity N facing outward, and the South side facing inward on the bipolar flanking magnet 106A, may be replaced by a plurality of smaller axially polarized cylindrical or disk magnets or rectangular or square (or other shaped) magnets 1514 with the same polarity S inward.

In some embodiments, the flanking magnets in any of the embodiments described herein may be polarized radially instead of axially or may have some polarized axially and the some polarized radially. Also, in some embodiments, the ring drive magnet or drive element in any of the embodiments described herein may be polarized radially instead of axially or, if the ring drive element contains a plurality of magnets, may have some magnets polarized axially and the some magnets polarized radially. Also, in some embodiments, the second flanking magnet 106A may be replaced by a bias object, having the properties of the bias objects or material changes or discontinuities described herein. Also, in some embodiments, it suffices for the present disclosure that the center of the bias object (bias point), or at least a portion of the bias object, may rotate within the inner diameter of ring drive element in any of the embodiments described herein for at least a portion of a full rotation of the rotating body. Also, in some embodiments, it suffices for the present disclosure that the center of the flanking magnets, or at least a portion of the flanking magnets, may rotate outside the outer diameter of ring drive element in any of the embodiments described herein for at least a portion of a full rotation of the rotating body. Also, in some embodiments, it suffices for the present disclosure that the center of the flanking magnets, or at least a portion of the flanking magnets, may be on a line with the rotation axis 110. in any of the embodiments described herein. Also, in some embodiments, the center axis 110A of the ring drive element may be aligned with or not aligned with (i.e., offset from) the rotation axis 110 of the rotating body 102 in any of the embodiments described herein, depending on the desired function and performance. In some embodiments, the alignment of the flanking magnets and ring drive magnets and bias object(s) described herein may not be exactly along the lines described above; however, it should be understood to those skilled in the art that the system may still function, but may be less efficient and/or require more input energy to sustain and/or control rotation of the rotating body. In some embodiments, the bias object 106 may have a dominant effect on the magnetic properties of the system of the present disclosure, which creates an instability, asymmetry, or non-linear effect, which causes rotation of the rotating body. Also, in some embodiments, there may be only a single flanking magnet 104 for any of the embodiments described herein.

Instead of the driving element 108 being a ring-shaped element, the driving element may be a solid circular element, such as a solid disc magnet or cylindrical magnet, or a solid ferrous body disc or cylinder. Also, in some embodiments, the driving element 108 may be an inverted bowl shape, which may be created by a plurality of concentrically smaller ring magnets stacked on each other (not shown). Otherwise, the operation of the elements in the system to generate rotation of the rotating body is substantially similar to the operation discussed above in connection with the system 100 of FIGS. 1A-1C and the system 300 of FIGS. 3A-3C.

Also, any of the embodiments of the drive element or driving element 108 described herein, e.g., magnet or ferrous body, solid or hollow or ring-shaped, may be referred to herein as the drive element or driving element 108. Also, the magnets shown herein may be permanent magnets or electro-magnets (driven by a known electronic drive circuit).

Also, in some embodiments, the permanent ring drive magnets 108 may have dimensions of 6 inch outer diameter and 4 inch inner diameter, or 8 inch outer diameter and 6 inch inner diameter, and be ½ inch in height. The ferrous pipe ring components may have similar ID and OD and be about 1 inch in height. Other dimensions may be used if desired.

It has been found that, in some embodiments, significantly more angular torque is generated when the magnetic field polarities between the flanking magnet 104 and the driving magnet or drive element 108 are in attraction (or have opposite magnetic polarities). In other words, when the magnetic polarities of the side of the flanking magnet 104 facing the side of the driving element magnet 108, and the side of the driving element 108 facing the flanking magnet 104, are opposite. For example, as shown in FIG. 1B, the flanking magnet 104, 104A side facing the ring element magnet 108 is north polarity and the ring element magnet 108 side facing the flanking magnet is south polarity (or the polarities could be vice-versa).

In some embodiments of the present disclosure, a system and method for generating rotation of a body includes a rotating body configured to rotate about a rotation axis, a permanent magnet and a bias object both arranged at least partially on or within the rotating body, and a ring element. An axial gap between the ring element and the rotating body exists in a direction parallel to the rotation axis. The ring element may be a ferrous body, permanent magnet or electro magnet, and the bias object may be made from one or more materials having magnetic states, such as magnetic, ferromagnetic, paramagnetic, and diamagnetic. Also, in some embodiments, the speed (or angular velocity) of or output torque generated by the rotating body may be adjusted by adjusting the axial gap.

In some embodiments of the present disclosure, a system for generating rotation of a body comprises a rotating body configured to rotate about a rotation axis; a permanent magnet connected to the rotating body such that the permanent magnet moves with the rotating body; a bias object connected to the rotating body such that the bias object moves with the rotating body; and a ring element; wherein the ring element comprises a permanent ring magnet; wherein the bias object is arranged closer to the rotation axis than the permanent magnet connected to the rotating body; and wherein an axial gap is arranged between the ring element and the rotating body.

Also, in some embodiments, the ring element (or drive element or driving element) may be a configured to be laterally displaced in a direction perpendicular to the rotation axis. Also, in some embodiments, the ring element may be a configured to be vertically displaced in a direction parallel to the rotation axis. Also, in some embodiments, the bias object comprises at least one of: a ferrous material, bismuth, water, plastic, copper, and aluminum. Also, in some embodiments, the bias object may be made from one or more materials having magnetic states, such as magnetic, ferromagnetic, paramagnetic, and diamagnetic. Also, in some embodiments, the speed of the rotating body may be adjusted by adjusting the axial gap between the bias magnet and the bottom of the driving element. Also, in some embodiments, the permanent magnet, the rotation axis and the first bias object form a first angle (alpha) having a predetermined value based on desired rotational performance of the rotating body. Also, in some embodiments, the first angle comprises a value of about 90 degrees. Also, in some embodiments, the first angle comprises a value of other than 0 or 180 degrees. Also, in some embodiments, a ring element coverage zone on and/or within the rotating body corresponding to an area aligned with an outer radial surface of the ring element, wherein the permanent magnet arranged on or within the rotating body moves along a magnet travel path through a full rotation of the rotating body; and wherein the magnet travel path is outside of the ring element coverage zone throughout a full rotation of the rotating body. Also, in some embodiments, the system also includes a ring opening zone on and/or within the rotating body corresponding to an area aligned with an inner radial surface of the ring element, wherein the bias object moves along a bias object travel path through a full rotation of the rotating body, wherein the bias object travel path is within the ring opening zone throughout a full rotation of the rotating body.

In addition, in some embodiments of the present disclosure, a system for generating rotation of a body, comprises a rotating body configured to rotate about a rotation axis; a permanent magnet connected to the rotating body, such that the permanent magnet moves with the rotating body; a bias object connected to the rotating body, such that the bias object moves with the rotating body; and a ring element; wherein the ring element comprises a ferrous material; wherein the bias object is arranged closer to the rotation axis than the permanent magnet; and wherein an axial gap is arranged between the ring element and the rotating body.

Also, in some embodiments, the ring element may be configured to be laterally displaced and/or axially displaced. Also, in some embodiments, the ring element is not arranged within a direct path between the permanent magnet and the rotation axis. Also, in some embodiments, the ring element is arranged parallel to the rotating body.

In addition, in some embodiments of the present disclosure, a method of generating rotation of a body, comprises providing a system comprising: a rotating body configured to rotate about a rotation axis; a permanent flanking magnet arranged on or within the rotating body; a bias object arranged on or within the rotating body; and a ring or drive element; wherein the bias object is arranged closer to the rotation axis than the permanent magnet arranged on or within the rotating body; and wherein an axial gap is arranged between the ring element and the rotating body; moving the ring element and/or the rotating body so that the axial gap between the ring element and the rotating body in a direction parallel to the rotation axis decreases, thereby causing the rotating body to rotate.

In addition, in some embodiments of the present disclosure a system and method for generating rotation of a body includes a rotating body configured to rotate about a rotation axis, a permanent flanking magnet and a bias object both arranged at least partially on or within the rotating body, and a drive or ring element. An axial gap between the ring element and the rotating body (or the flanking magnet) exists in an axial direction parallel to the rotation axis. The ring element may be a ferrous body, permanent magnet or electromagnet, and the bias object may be made from or comprise one or more materials of magnetic states, such as magnetic, ferromagnetic, paramagnetic, and diamagnetic. Also, in some embodiments, the speed of, or rotational forces on, the rotating body may be adjusted by adjusting the axial gap or the magnetic field strength of the drive element and/or the flanking magnet. Also, the bias object and flanking magnet are arranged such that the angle alpha is other than 0° or 180°, i.e., such that the bias object 106 is not arranged in a direct path (or straight line) between the flanking magnet 104 and the rotation axis 110 (i.e., on the other side of the rotation axis 110 if the direct path 202 were to continue through the rotation axis 110, i.e. not 180°). Also, in some embodiments, the second flanking magnet 106A may be positioned outside the outer diameter of the ring element 108 along the alpha angle 180° and have an axially polarized polarity opposite to that of the first flanking magnet 104. In some embodiments, using a second flanking magnet may enhance the rotational forces and may create smoother rotation than having a single flanking magnet.

Also, in some embodiments, the system and method of the present disclosure also comprises laterally moving the ring element in a direction perpendicular to the rotation axis, and/or axially moving the ring element parallel to the rotation axis to adjust the speed or rotational force on the rotating body. Also, in some embodiments the ring element comprises a ferrous body, a permanent magnet or an electromagnet.

Conditional language, such as, among others, "can," "could," "might," or "may," unless specifically stated otherwise, or otherwise understood within the context as used, is generally intended to convey that certain embodiments could include, but do not require, certain features, elements, or steps. Although the invention has been described and illustrated with respect to exemplary embodiments thereof, the foregoing and various other additions and omissions may be made therein and thereto without departing from the spirit and scope of the present disclosure. It should be understood that, unless otherwise explicitly or implicitly indicated herein, any of the features, characteristics, alternatives or modifications regarding a particular embodiment herein may also be applied, used, or incorporated with any other embodiment described herein. Also, the drawings herein are not drawn to scale, unless indicated otherwise.

What is claimed is:

1. A system for generating rotation of a body, comprising:
   a rotating body configured to rotate about a rotation axis;
   a first flanking permanent magnet connected to the rotating body such that the first flanking permanent magnet moves with the rotating body;
   a bias object connected to the rotating body such that the bias object moves with the rotating body; and
   a permanent magnet ring drive element comprising a permanent magnet and having an inner diameter and an outer diameter;
   wherein the first flanking magnet has a first polarity facing the ring drive element or facing the rotation axis;
   wherein the first flanking permanent magnet, the rotation axis and the bias object form a bias object angle having a predetermined value based on desired rotational performance of the rotating body;
   wherein an axial gap is arranged between the ring drive element and the rotating body;
   wherein at least a portion of the first flanking magnet rotates outside the outer diameter of the ring drive element and at least a portion of the bias object rotates within the inner diameter of the ring drive element for at least a portion of a full rotation of the rotating body; and
   wherein magnetic field interaction between the permanent magnet ring drive element, the first flanking magnet, and the bias object causes the body to rotate about the rotation axis.

2. The system of claim 1, wherein the ring drive element is a configured to be laterally displaced in a direction perpendicular to the rotation axis.

3. The system of claim 1, wherein the ring drive element is a configured to be vertically displaced in a direction parallel to the rotation axis.

4. The system of claim 1, wherein the bias object comprises at least one of: a ferrous material, bismuth, water, plastic, rubber, wood, hydrogel, polymer, copper, aluminum, an organic material, a plastic bowl, rod, stick, wooden dowel, rock, and hemp paper.

5. The system of claim 1, wherein the bias object is made from one or more materials having magnetic states, comprising at least one of magnetic, ferromagnetic, paramagnetic, and diamagnetic.

6. The system of claim 1, wherein the rotational speed of or the rotation forces on the rotating body may be adjusted by at least one of: adjusting the axial gap, adjusting a lateral position of the ring drive element perpendicular to the rotation axis, and adjusting the magnetic field strength of the ring drive element or the first flanking magnet.

7. The system of claim 1 further comprising:
   a second flanking permanent magnet connected to the rotating body such that the second flanking permanent magnet moves with the rotating body, the second flanking magnet having a second polarity facing the ring drive element or facing the rotation axis, the first polarity being opposite to the second polarity;
   wherein the first flanking magnet, the rotational axis, and the second flanking magnet form a second flanking magnet angle having a predetermined value based on desired rotational performance of the rotating body;
   wherein at least a portion of the second flanking magnet rotates outside the outer diameter of the ring drive element for at least a portion of a full rotation of the rotating body; and wherein magnetic field interaction between the permanent magnet ring drive element, the first flanking magnet, the second flanking magnet, and the bias object causes the body to rotate about the rotation axis.

8. The system of claim 1 wherein the bias object angle comprises a value of about 90 degrees or about 270 degrees.

9. The system of claim 1 wherein the bias object angle comprises a value of other than 0 or 180 degrees.

10. The system of claim 1, wherein the ring drive element comprises at least one of a ring magnet and a plurality of individual permanent magnets arranged in a circular ring shape.

11. The system of claim 1, wherein the rotating body rotates in a first direction when the ring drive element has a first polarity facing the rotating body and rotates in an opposite direction when ring drive element has the first polarity facing away from the rotating body.

12. The system according to claim 1, wherein the ring drive element is arranged parallel to the rotating body.

13. The system according to claim 1, wherein the ring drive element is connected to a plunger mechanism configured to move in an axial or radial direction which adjusts at least one of the speed of rotation of the rotating body and rotational forces on the rotating body.

14. The system according to claim 1, wherein the rotating body is mechanically connected to an electrical alternator which generates electricity in response to the rotation of the rotating body.

15. The system according to claim 1, further comprising a controller which controls the lateral or axial position of the ring drive element to control the rotational speed of or the output torque generated by the rotating body.

16. A system for generating rotation of a body, comprising:
a rotating body configured to rotate about a rotation axis;
a first flanking permanent magnet connected to the rotating body such that the first flanking permanent magnet moves with the rotating body;
a bias object connected to the rotating body such that the bias object moves with the rotating body; and
a permanent magnet ring drive element comprising a permanent magnet and having an inner diameter and an outer diameter;
wherein an axial gap is arranged between the ring drive element and the rotating body;
wherein the first flanking permanent magnet, the rotation axis and the bias object form a bias object angle having a value other than 0 degrees or 180 degrees;
wherein at least a portion of the first flanking magnet rotates outside the outer diameter of the ring drive element and at least a portion of the bias object rotates within the inner diameter of the ring drive element for at least a portion of a full rotation of the rotating body; and
wherein magnetic field interaction between the permanent magnet ring drive element, the first flanking magnet, and the bias object causes the body to rotate about the rotation axis.

17. The system of claim 16, further comprising:
a second flanking permanent magnet connected to the rotating body such that the second flanking permanent magnet moves with the rotating body;
wherein the first flanking magnet has a first polarity facing the ring drive element or facing the rotation axis and the second flanking magnet has a second polarity facing the ring drive element or facing the rotation axis, the first polarity being opposite to the second polarity;
wherein the first flanking magnet, the rotational axis, and the second flanking magnet form a second flanking magnet angle having a predetermined value based on desired rotational performance of the rotating body; and
wherein at least a portion of the first flanking magnet and at least a portion of the second flanking magnet lie on a same line as the rotational axis.

18. The system of claim 16, wherein the rotational speed of or the output torque generated by the rotating body may be adjusted by at least one of: adjusting the axial gap, adjusting a lateral position of the ring drive element perpendicular to the rotation axis, and adjusting the magnetic field strength of the ring drive element or the first flanking magnet.

19. A system for generating rotation of a body to generate electricity, comprising:
a rotating body configured to rotate about a rotation axis;
a first flanking permanent magnet connected to the rotating body such that the first flanking permanent magnet moves with the rotating body;
a bias object connected to the rotating body such that the bias object moves with the rotating body; and
a permanent magnet ring drive element comprising a permanent ring magnet and having an inner diameter and an outer diameter;
wherein the first flanking permanent magnet, the rotation axis and the bias object form a bias object angle having a predetermined value based on desired rotational performance of the rotating body;
wherein an axial gap is arranged between the ring drive element and the rotating body;
wherein at least a portion of the first flanking magnet rotates outside the outer diameter of the ring drive element and at least a portion of the bias object rotates within the inner diameter of the ring drive element for at least a portion of a full rotation of the rotating body;
wherein magnetic field interaction between the permanent magnet ring drive element, the first flanking magnet, and the bias object causes the body to rotate about the rotation axis; and
wherein the rotating body is mechanically connected to an electrical alternator which generates electricity in response to the rotation of the rotating body.

20. The system of claim 7, wherein the second flanking magnet angle comprises a value of about 180 degrees.

* * * * *